(12) United States Patent
Nohara et al.

(10) Patent No.: US 12,418,714 B2
(45) Date of Patent: Sep. 16, 2025

(54) IMAGING DEVICE AND IMAGING CONTROL METHOD

(71) Applicant: SONY GROUP CORPORATION, Tokyo (JP)

(72) Inventors: Fuminori Nohara, Tokyo (JP); Satoshi Takada, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 1 day.

(21) Appl. No.: 18/261,577

(22) PCT Filed: Dec. 17, 2021

(86) PCT No.: PCT/JP2021/046766
§ 371 (c)(1),
(2) Date: Jul. 14, 2023

(87) PCT Pub. No.: WO2022/158202
PCT Pub. Date: Jul. 28, 2022

(65) Prior Publication Data
US 2024/0314422 A1 Sep. 19, 2024

(30) Foreign Application Priority Data
Jan. 25, 2021 (JP) ................. 2021-009855

(51) Int. Cl.
*H04N 23/63* (2023.01)
*H04N 23/667* (2023.01)

(52) U.S. Cl.
CPC ........... *H04N 23/63* (2023.01); *H04N 23/667* (2023.01)

(58) Field of Classification Search
CPC .............................. H04N 23/63; H04N 23/667
USPC ...................................... 348/333.01
See application file for complete search history.

(56) References Cited

U.S. PATENT DOCUMENTS

| | | | | |
|---|---|---|---|---|
| 2014/0240542 A1* | 8/2014 | Toguchi | ............... | H04N 23/665 348/231.99 |
| 2015/0022688 A1* | 1/2015 | Shiohara | ............... | H04N 25/53 348/229.1 |

FOREIGN PATENT DOCUMENTS

| | | |
|---|---|---|
| JP | 2020-188452 A | 11/2020 |
| WO | 2018/179710 A1 | 10/2018 |
| WO | 2018/179711 A1 | 10/2018 |

OTHER PUBLICATIONS

International Search Report and Written Opinion of PCT Application No. PCT/JP2021/046766, issued on Mar. 8, 2022, 08 pages of ISRWO.

* cited by examiner

*Primary Examiner* — Joel W Fosselman
(74) *Attorney, Agent, or Firm* — CHIP LAW GROUP

(57) ABSTRACT

An imaging device includes a control unit configured to, before starting processing of reading a pixel signal forming a still image to be recorded from an imaging element in a case where an operation for still image imaging and recording is performed, calculates displayable timing in a display unit for the still image, and performs display setting processing according to the calculated displayable timing.

14 Claims, 12 Drawing Sheets

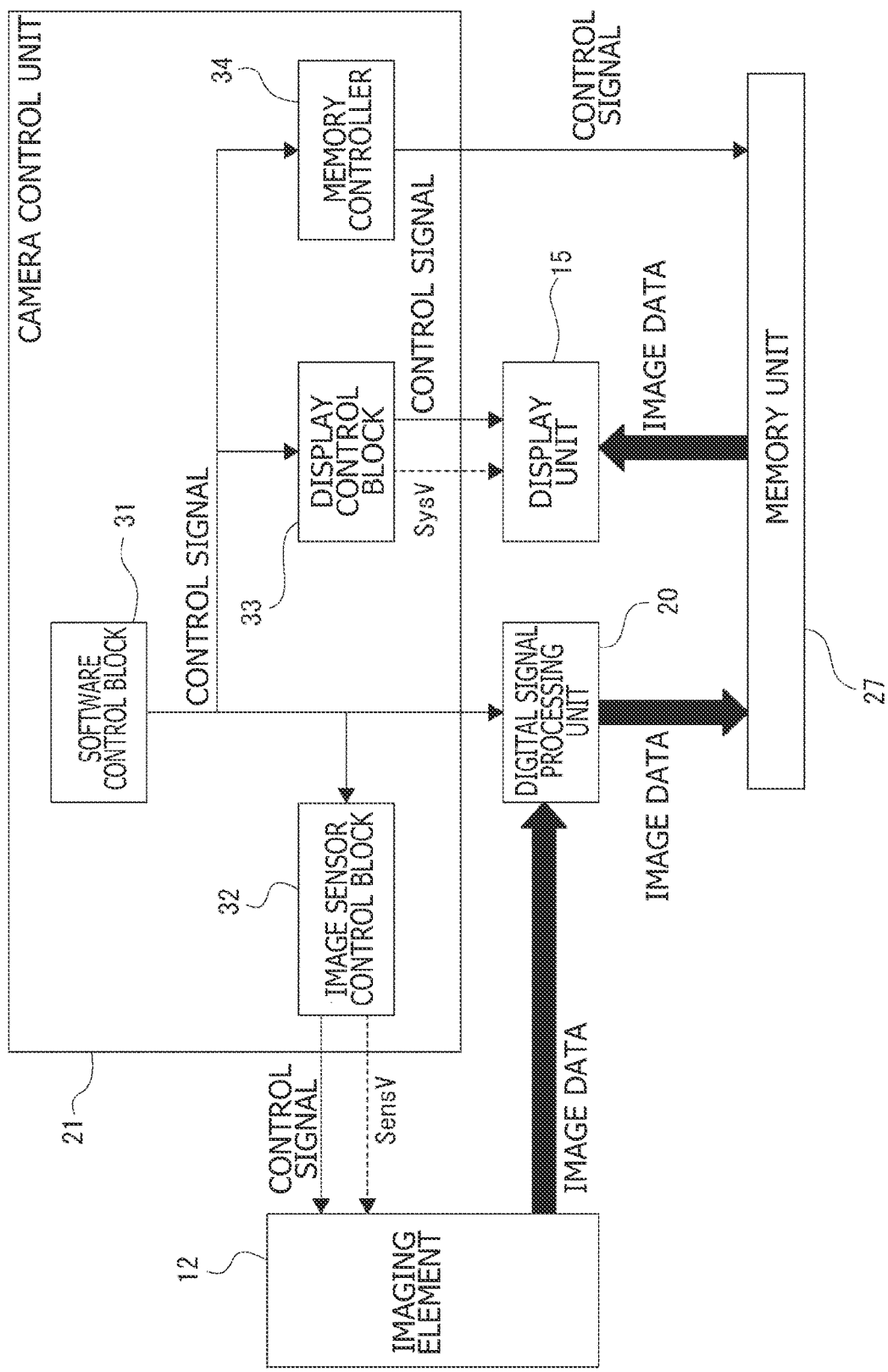
F I G . 2

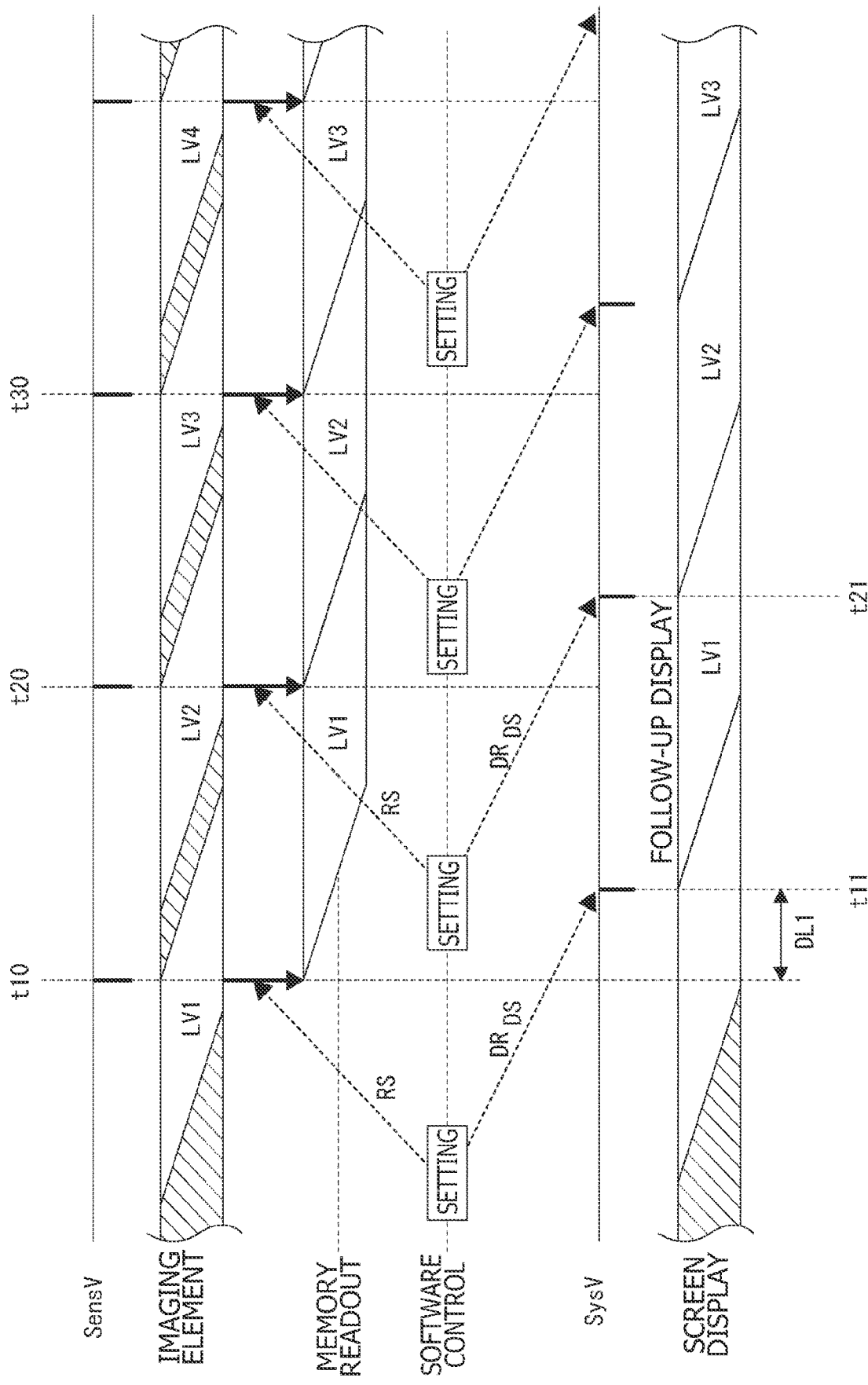

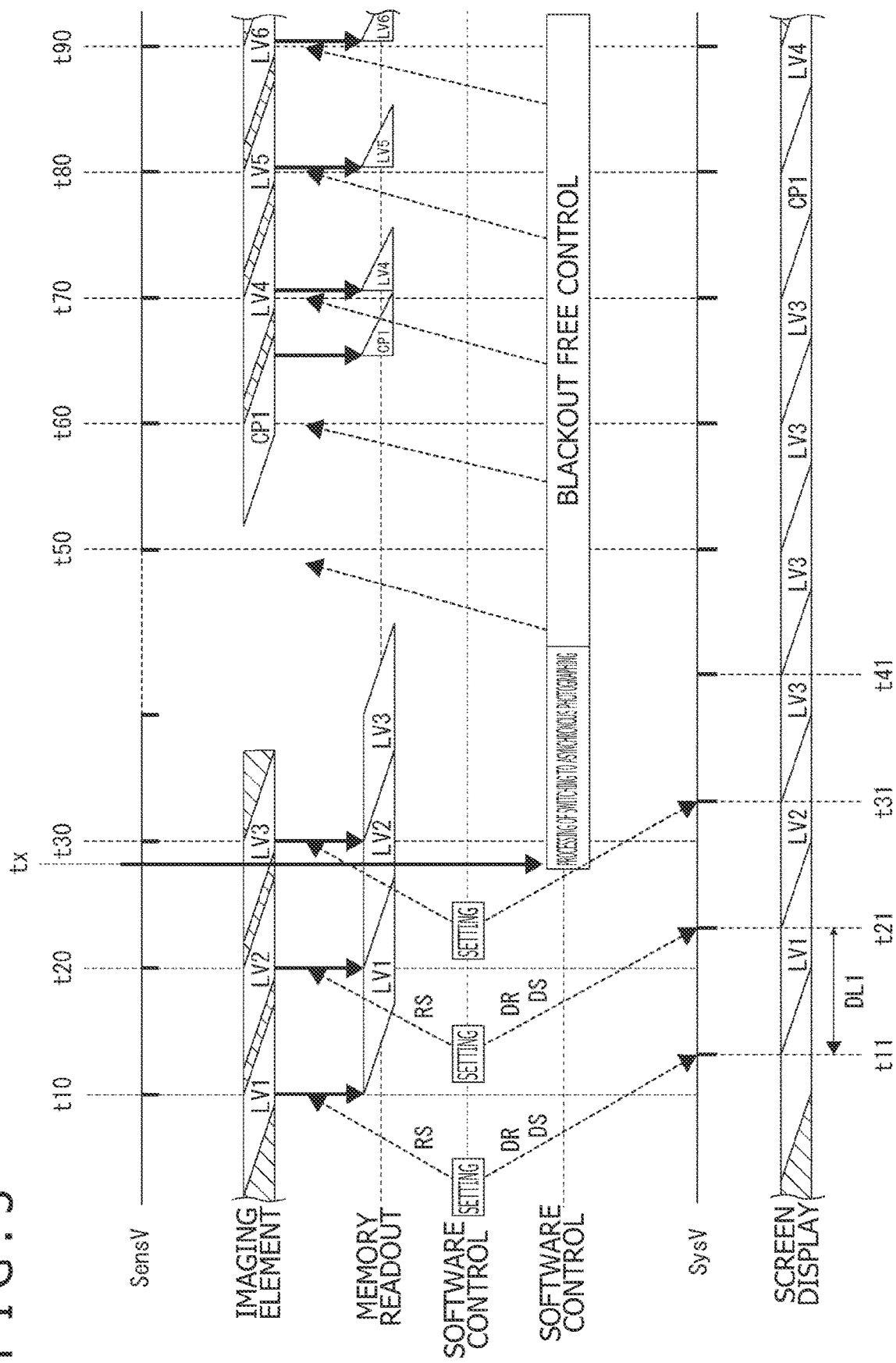

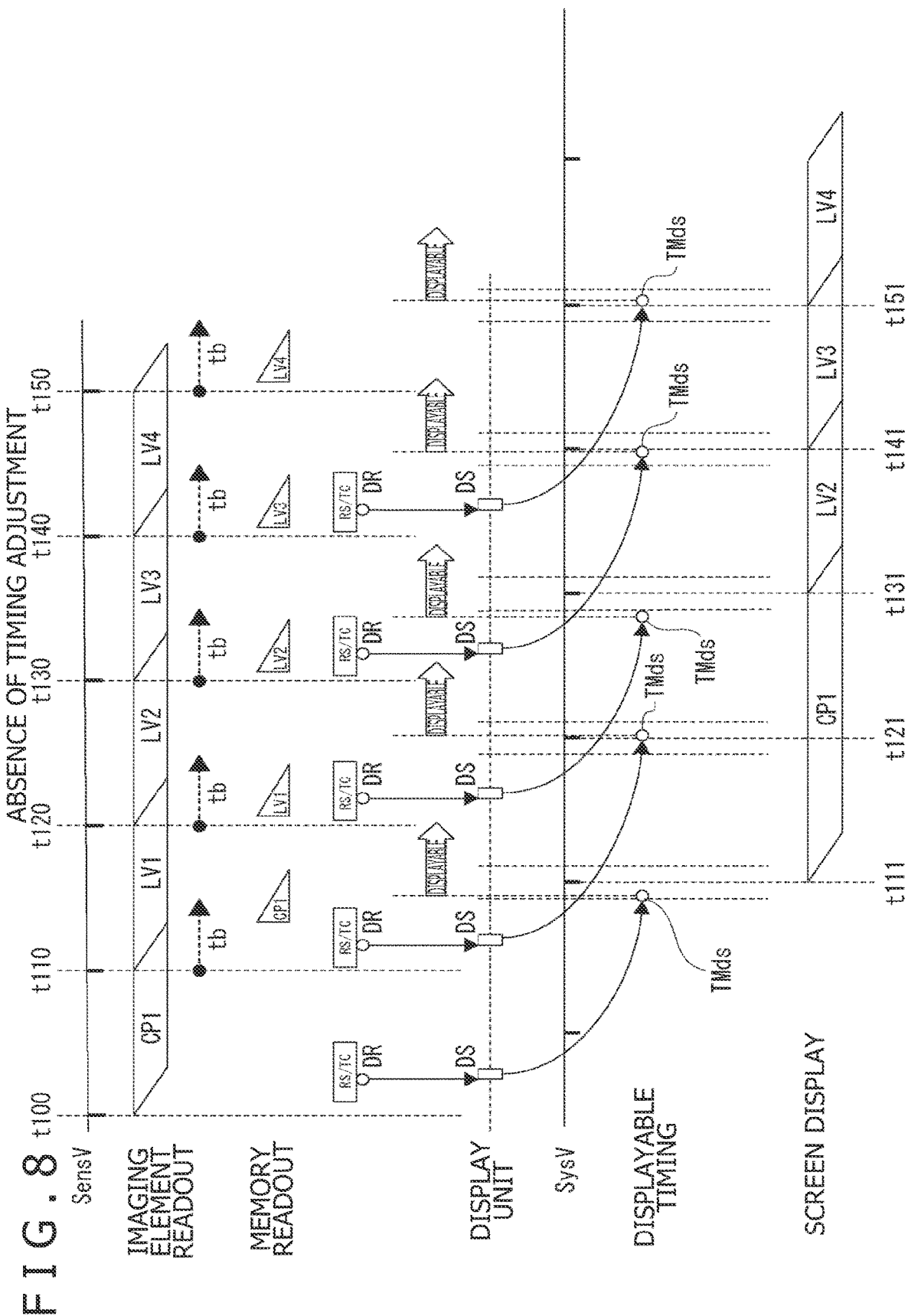

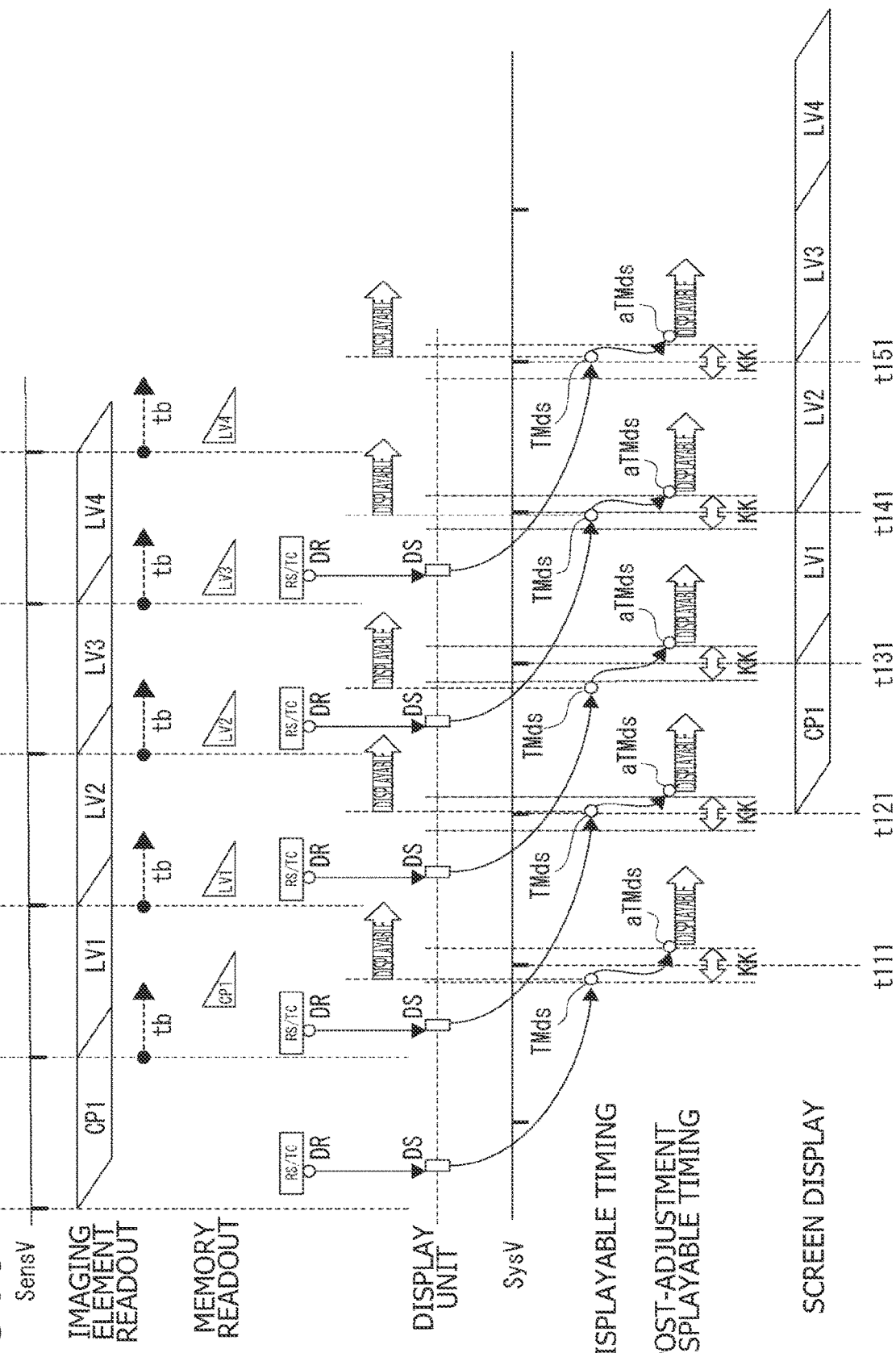

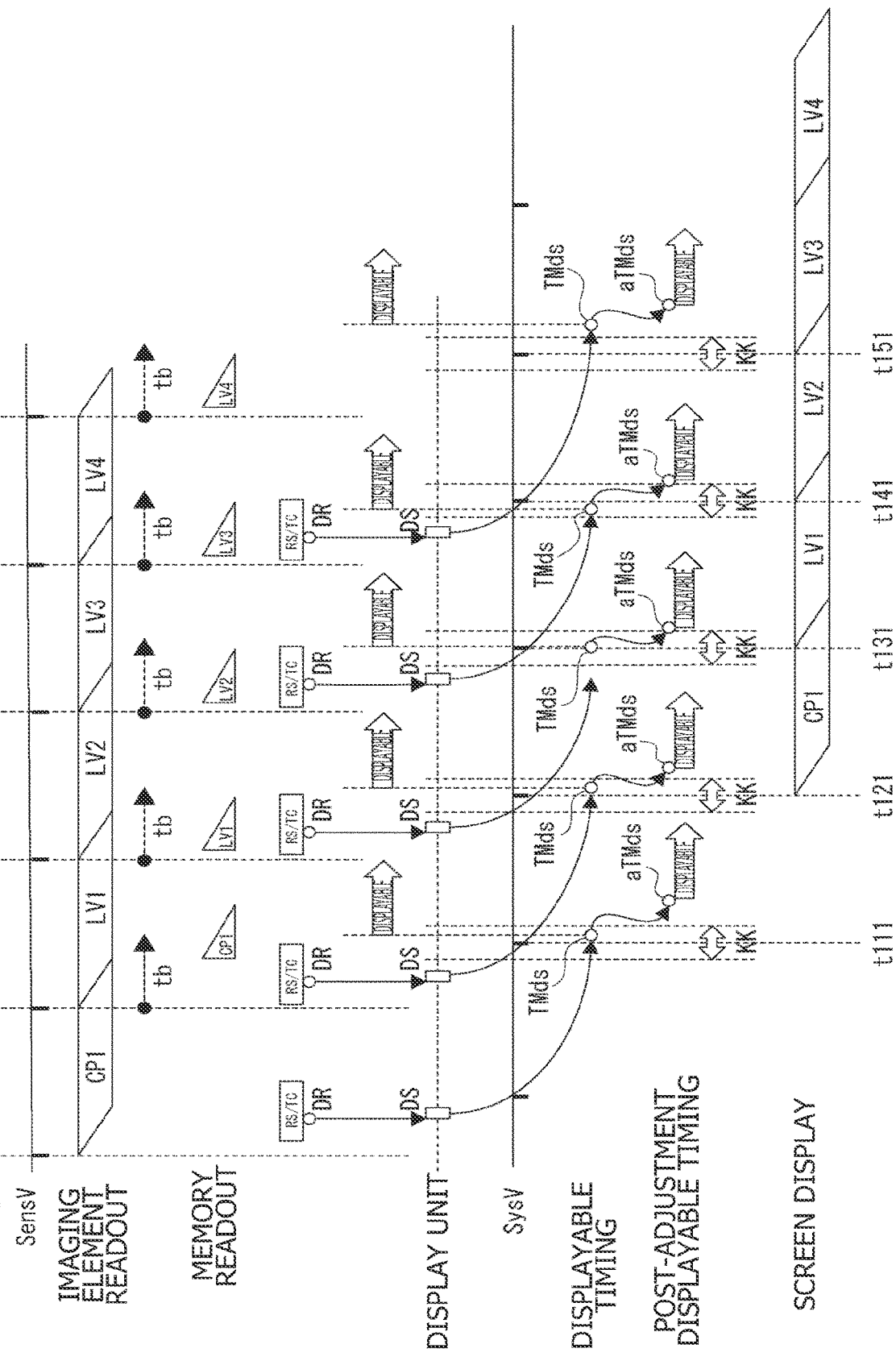

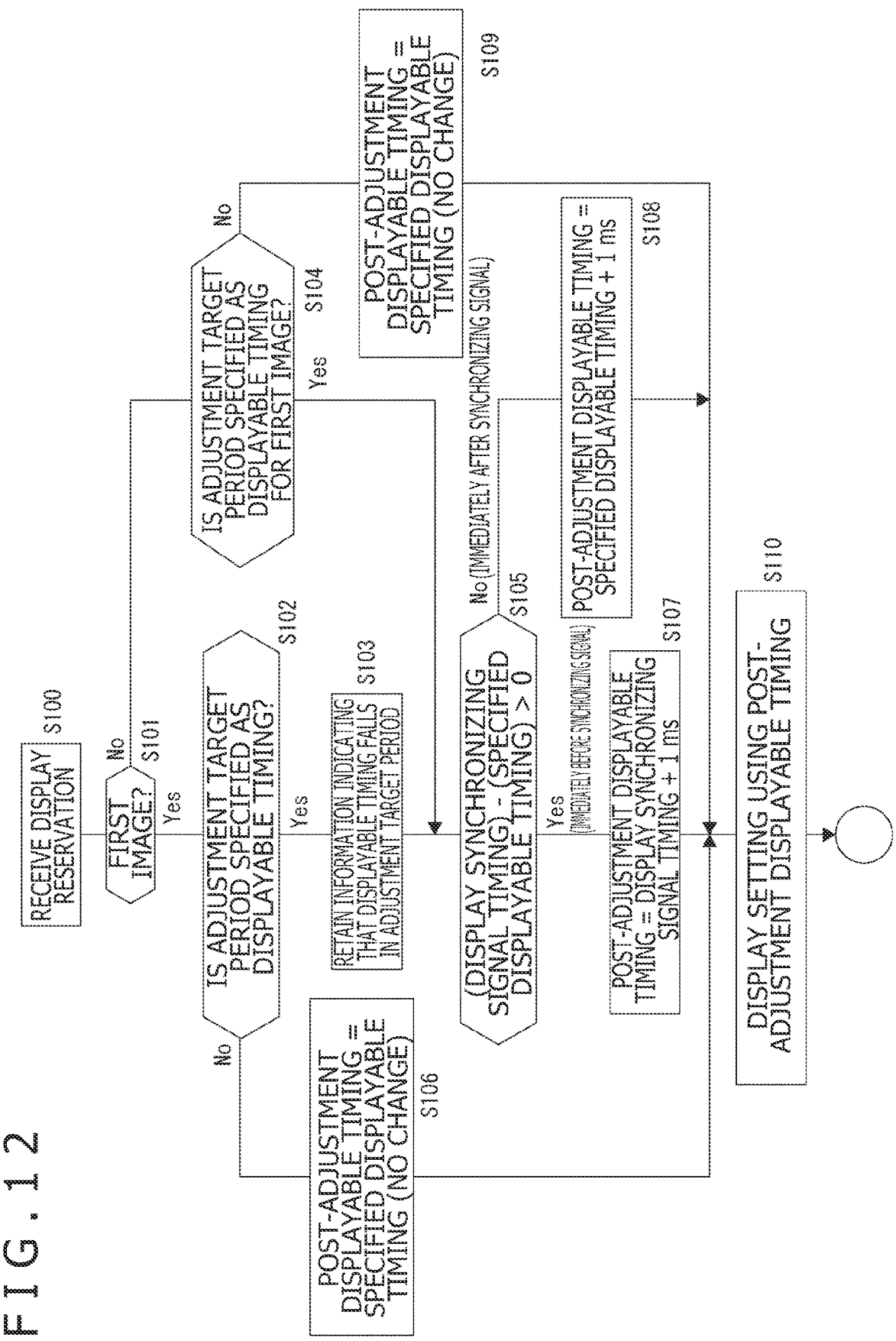
F I G. 1 2

IMAGING DEVICE AND IMAGING CONTROL METHOD

CROSS REFERENCE TO RELATED APPLICATIONS

This application is a U.S. National Phase of International Patent Application No. PCT/JP2021/046766 filed on Dec. 17, 2021, which claims priority benefit of Japanese Patent Application No. JP 2021-009855 filed in the Japan Patent Office on Jan. 25, 2021. Each of the above-referenced applications is hereby incorporated herein by reference in its entirety.

TECHNICAL FIELD

The present technology relates to an imaging device, an imaging control method, and a program, and particularly to a technology of display control at a time of still image imaging and recording.

BACKGROUND ART

Many users using an imaging device (camera) (in the present disclosure, a user refers mainly to a person who performs imaging by using a camera) check an image displayed on a display unit such as a display panel or an EVF (electric viewfinder) provided to a back surface of the camera, that is, a live view image, determine photographing timing, and perform a release operation (shutter operation or the like). At a time of this release operation, a delay in image display may occur for reasons of switching of a light exposure operation and the like.

Incidentally, PTL 1 discloses a technology for avoiding a blackout in which an image is interrupted at the time of the release operation.

CITATION LIST

Patent Literature

[PTL 1]
PCT Patent Publication No. WO2018/179711

SUMMARY

Technical Problems

Now, at a time of performing still image recording as consecutive-shot imaging or single-shot imaging (imaging of one still image) in response to the release operation or the like while displaying the live view image, for example, it is difficult to change a display frame in timing similar to that of immediately preceding live view image display. This is because processing of switching from light exposure/readout for live view to light exposure/readout for still image recording in an imaging element (image sensor) and the like take time. A user therefore has a feeling such that display is momentarily delayed after the release operation. The delay in the display is felt easily particularly when consecutive photographing is performed so as to follow a moving subject, for example. In this case, it may become difficult for the user to perform framing while viewing a live view image.

Accordingly, the present technology proposes a technology for improving display responsiveness at a time of an operation for still image imaging and recording.

Solution to Problems

An imaging device according to the present technology includes a control unit configured to, before starting processing of reading a pixel signal forming a still image to be recorded from an imaging element in a case where an operation for still image imaging and recording is performed, calculates displayable timing in a display unit for the still image, and performs display setting processing according to the calculated displayable timing.

Consecutive-shot imaging, which images and records multiple still images consecutively in a period in which a user is performing a release operation, and single-shot imaging, which records one still image in response to a release operation, for example, are assumed. In these cases, in response to a release operation, timing is calculated in which a still image obtained by performing light exposure at a time of the release operation becomes displayable on the display unit. The processing of a display setting according to information of the displayable timing is performed.

In the imaging device according to the present technology described above, image data of one frame based on the pixel signal read from the imaging element may be configured to be read from a memory and used for display after being temporarily written to the memory, and the control unit may perform control to start reading image data of a frame related to imaging after the operation from the memory before completion of writing the image data of the frame to the memory.

A case is assumed in which a configuration that temporarily buffers the image data of each imaged frame in the memory after signal processing, reads the image data, and transfers the image data to the display unit is adopted. In this case, while the image data is written to the memory on a line-by-line basis, a readout for display is started at a first line before writing of one frame is completed. This means that "follow-up display" to be described later is performed.

In the imaging device according to the present technology described above, in a period of displaying an image imaged by the imaging element, without recording the image, a sensor synchronizing signal defining a frame period of an imaging operation in the imaging element and a display synchronizing signal defining a frame period of a display operation in the display unit may be in a constant phase relation, and the phase relation may be varied when the operation for the still image imaging and recording is performed.

In a period in which a generally-called live view image is displayed and monitoring is performed, for example, before the release operation or the like, a first synchronizing signal for controlling the imaging element and a second synchronizing signal for controlling the display unit are shifted from each other so as to have a constant relation to each other. It is thereby possible to display the image read from the imaging element as early as possible as the "follow-up display" to be described later, for example. At a time of the operation for the still image imaging and recording (for example, a release operation), light exposure processing and subsequent processing for still image recording are performed in as early timing as possible without maintaining the phase relation.

In the imaging device according to the present technology described above, during a light exposure period of light exposure in the imaging element in response to the operation for the still image imaging and recording, the control unit may perform calculation of the displayable timing and processing of a display reservation that gives an instruction for a display setting according to the calculated displayable timing.

As processing before the pixel signal is read from the imaging element, for example, the calculation of the displayable timing and the display reservation are made in advance during the light exposure period.

In the imaging device according to the present technology described above, the control unit may perform the display setting processing such that display is made in timing of a display synchronizing signal identified according to an anteroposterior relation between closing timing for each frame period based on the display synchronizing signal defining a frame period of a display operation in the display unit and timing of a display reservation that gives an instruction for a display setting in response to the calculation of the displayable timing.

Assuming a time taken for the display setting, the closing timing is set which enables display to be made in next display synchronizing signal timing for each frame period. Whether display is to be made in the next display synchronizing signal timing or display synchronizing signal timing following the next display synchronizing signal timing as viewed from the time point of the display reservation is allowed to be determined according to an anteroposterior relation between the timing of the display reservation and the closing timing.

In the imaging device according to the present technology described above, the control unit may perform processing of continuing image display on the display unit also in a period from a time of execution of the operation for the still image imaging and recording to execution of display based on the pixel signal forming the still image to be recorded.

For example, display is prevented from being blacked out also immediately after the release operation.

In the imaging device according to the present technology described above, the control unit may perform adjustment processing of adjusting the displayable timing on the basis of a comparison between the displayable timing and timing of a display synchronizing signal defining a frame period of a display operation in the display unit.

The displayable timing is adjusted when the displayable timing and the display synchronizing signal coincide with each other or are slightly shifted from each other.

In the imaging device according to the present technology described above, the control unit may set a period from timing preceding the display synchronizing signal by a predetermined time to the timing of the display synchronizing signal as an adjustment target period, and when the displayable timing is within the adjustment target period, the control unit may perform the adjustment processing of adjusting the displayable timing.

A period before the timing of the display synchronizing signal and near the timing of the display synchronizing signal is set as the adjustment target period.

In the imaging device according to the present technology described above, when the displayable timing is within the adjustment target period, the control unit may perform the adjustment processing such that a time exceeding a time from the displayable timing to the display synchronizing signal is added to the displayable timing.

That is, the displayable timing is set to be timing outside the adjustment target period which timing is beyond the timing of the nearest display synchronizing signal.

In the imaging device according to the present technology described above, the control unit may set a period from the timing of the display synchronizing signal to a time point succeeding the timing of the display synchronizing signal by a predetermined time as an adjustment target period, and when the displayable timing is within the adjustment target period, the control unit may perform the adjustment processing of adjusting the displayable timing.

A period after the timing of the display synchronizing signal and near the timing of the display synchronizing signal is set as the adjustment target period.

In the imaging device according to the present technology described above, when the displayable timing is within the adjustment target period, the control unit may perform the adjustment processing such that a time equal to or more than the predetermined time is added to the displayable timing.

That is, the displayable timing is set to be timing outside the adjustment target period which timing is separated from the timing of the display synchronizing signal by the predetermined time or more.

In the imaging device according to the present technology described above, the operation for the still image imaging and recording may include an operation for consecutive-shot imaging.

When a release operation, for example, is performed for the consecutive-shot imaging, the calculation of the displayable timing and a corresponding display setting are made.

An imaging control method according to the present technology is an imaging control method performed by an imaging control device, the imaging control method including performing control of, before starting processing of reading a pixel signal forming a still image to be recorded from an imaging element in a case where an operation for still image imaging and recording is performed, calculating displayable timing in a display unit for the still image, and performing display setting processing according to the calculated displayable timing.

A state in which display is delayed at a time of still image imaging and recording is thereby avoided.

A program according to the present technology is a program for causing an arithmetic processing device to execute the control described above.

An imaging control device and an imaging device according to the present disclosure can be thereby implemented easily.

BRIEF DESCRIPTION OF DRAWINGS

FIG. 2 is a diagram of assistance in explaining software functions of a camera signal processing unit according to the embodiment.

FIG. 4 is a diagram of assistance in explaining follow-up display.

FIG. 5 is a diagram of assistance in explaining a variation in a phase relation at a time of still image imaging and recording.

FIG. 8 is a diagram of assistance in explaining a case where displayable timing adjustment is not made by control according to the embodiment.

FIG. 9 is a diagram of assistance in explaining a case where displayable timing adjustment is made by the control according to the embodiment.

FIG. 10 is a diagram of assistance in explaining a case where displayable timing adjustment is made by the control according to the embodiment.

FIG. 12 is a flowchart of displayable timing adjustment processing according to the embodiment.

DESCRIPTION OF EMBODIMENT

An embodiment will hereinafter be described in the following order.
<1. Configuration of Imaging Device>
<2. Follow-Up Display and Phase Relation during Still Image Imaging>
<3. Display Control>
<4. Adjustment Processing>
<5. Summary and Modifications>

Incidentally, meanings of several terms used in the present disclosure will be described in advance.

"Imaging" refers to an operation of light exposure of an imaging element (image sensor) and readout of signals (image signal) of pixels subjected to the light exposure. The image signal obtained by the imaging is subjected to signal processing for each frame, and converted into image data forming a still image. As this image data, there is image data used as a live view image and image data recorded as a still image and used also as a live view image.

"Imaging and recording" refers to an operation of recording a still image on a recording medium in response to a release operation of a user or the like. For example, imaging and recording is performed in response to an operation for generally-called consecutive-shot imaging or single-shot imaging.

"Single-shot imaging" is an operation of imaging and recording one still image in response to a release operation (for example, a shutter operation).

"Consecutive-shot imaging" is an operation of imaging and recording multiple still images during a release operation (during the depression of a shutter button).

A "captured image" is an image based on an image signal obtained by a light exposure operation for image recording, the light exposure operation being performed in response to an instruction for still image imaging and recording which instruction is given by a release operation of the user (imaging person) or the like. The captured image is recorded on a recording medium as a still image, multiple still images resulting from consecutive photographing, or the like.

"Capture light exposure" refers to a light exposure operation at a time of obtaining a captured image.

A "live view image" or an "LV image" refers to an image imaged by the imaging element and displayed in a state of being visible to the user on a display unit. That is, the image illustrates a view on a subject side in real time.

At a time point before a release operation for a still image, for example, the image data of respective frames of live view images is generated by imaging low resolution images.

Live view images in a case of consecutive-shot imaging or single-shot imaging are generated from both of capture light exposure and LV light exposure between frames.

Incidentally, in general, a captured image is generated and recorded as a high resolution image having a high number of pixels reflecting the number of pixels of the imaging element, whereas a live view image is generated and displayed as an image having a low resolution adjusted to the number of displayable pixels of the display unit.

1. CONFIGURATION OF IMAGING DEVICE

Figure 1:
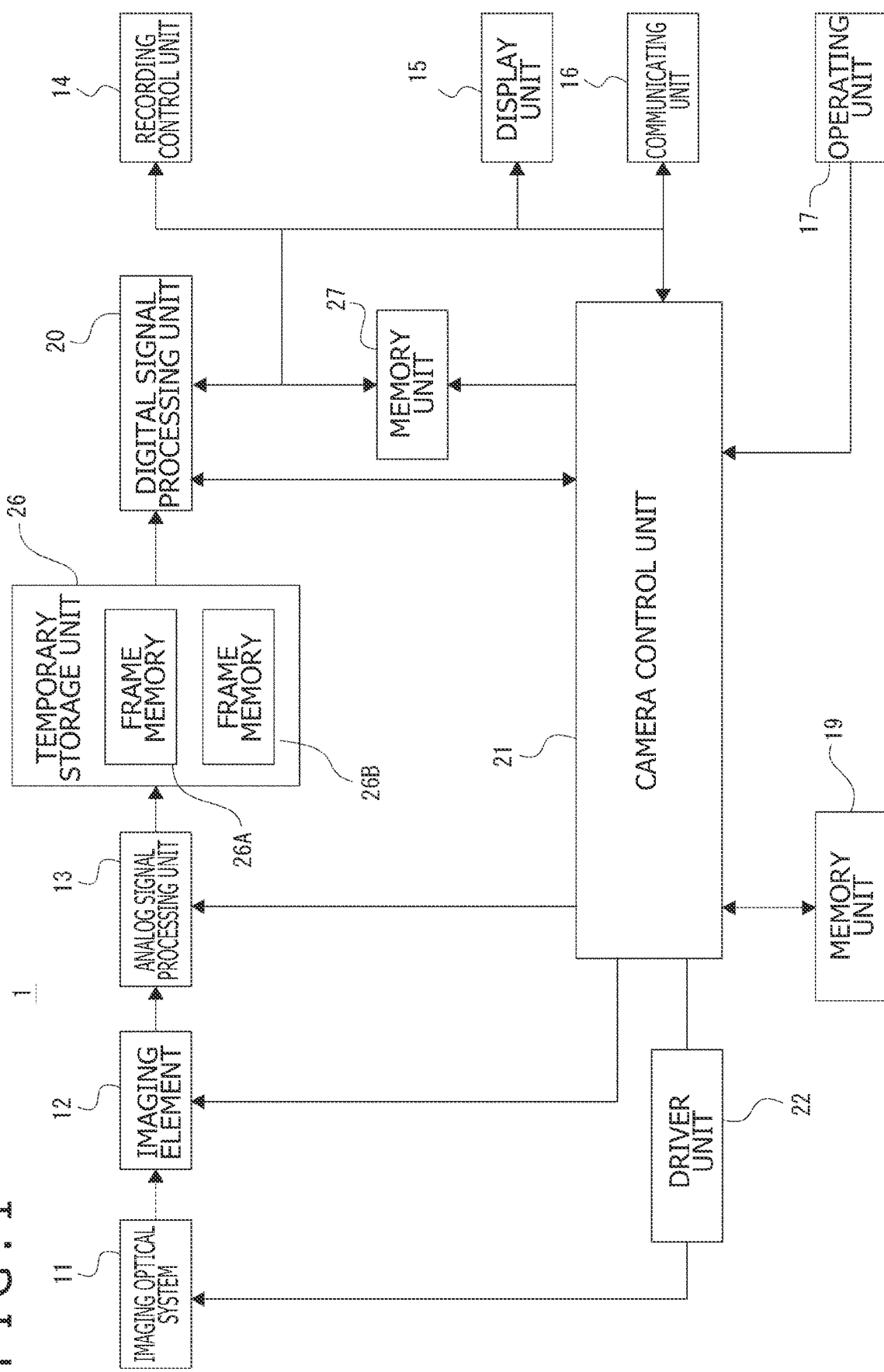
FIG. 1 is a block diagram of an imaging device according to an embodiment of the present technology.

FIG. 1 illustrates an example of a configuration of an imaging device 1 according to the embodiment.

In the imaging device 1, light from a subject enters an imaging element 12 formed by, for example, a CMOS (Complementary Metal Oxide Semiconductor) sensor, a CCD (Charge Coupled Device) sensor, or the like via an imaging optical system 11, and is subjected to photoelectric conversion in the imaging element 12, so that an analog image signal is obtained from the imaging element 12.

The imaging optical system 11 is provided with various kinds of lenses such as a zoom lens, a focus lens, and a condensing lens, a diaphragm mechanism, a zoom lens driving mechanism, and a focus lens driving mechanism. There is a case where a mechanical shutter (for example, a focal plane shutter) is provided.

The imaging element 12 is formed by two-dimensionally arranging multiple pixels including a photodiode (photogate), a transfer gate (shutter transistor), a switching transistor (address transistor), an amplifying transistor, a reset transistor (reset gate), and the like on a CMOS substrate, for example. In addition, a vertical scanning circuit, a horizontal scanning circuit, and an image signal output circuit are formed in the imaging element 12.

The imaging element 12 may be either of a primary color type and a complementary color type. An analog image signal obtained from the imaging element 12 is a primary color signal of each color of RGB or a color signal of a complementary color type. In addition, the imaging element 12 may have a configuration without color filters, so that the analog image signal obtained from the imaging element 12 may be a monochrome image signal.

In an analog signal processing unit 13 configured as an IC (Integrated circuit), the analog image signal from the imaging element 12 is sampled and held for each color signal, is adjusted in amplitude by AGC (Automatic Gain Control), and is converted into a digital image signal by A/D (Analog to Digital) conversion.

The digital image signal from the analog signal processing unit 13 (which digital image signal will hereinafter be referred to as image data) is input to a temporary storage unit 26.

Incidentally, the imaging element 12 and the analog signal processing unit 13 or the imaging element 12, the analog signal processing unit 13, and the temporary storage unit 26 may be integrated with each other. In addition, frame memories to be next described as the temporary storage unit 26 may be provided within a laminated type imaging element.

The temporary storage unit 26 in the present example includes two frame memories 26A and 26B.

The image data from the analog signal processing unit 13 is alternately stored in the frame memory 26A and the frame memory 26B. That is, the temporary storage unit 26 stores two consecutively imaged image frames. The image data stored in the temporary storage unit 26 is sequentially output to a digital signal processing unit 20, starting with a preceding stored frame. That is, the image data is sequentially output to the digital signal processing unit 20 alternately from the frame memory 26A and the frame memory 26B according to imaging order.

Because the frame memories 26A and 26B are thus provided, live view images can continue to be displayed without a blackout even during consecutive-shot imaging, for example.

The digital signal processing unit 20 is, for example, configured as an image processing processor by a DSP (Digital Signal Processor) or the like. The digital signal processing unit 20 performs various kinds of signal processing on the image data input thereto. The digital signal processing unit 20 performs preprocessing, synchronization processing, YC generation processing, and the like as camera processes, for example.

In addition, the digital signal processing unit 20 performs file generation for recording or for communication by performing compression coding, formatting, metadata generation and addition, and the like for recording or for communication, for example, as file formation processing for the image data resulting from the various kinds of processing. For example, an image file in a format such as JPEG, TIFF (Tagged Image File Format), or GIF (Graphics Interchange Format) is generated as a still image file. In addition, an image file may be generated in an MP4 format used for the recording of moving images and sound compliant with MPEG-4 or the like.

Incidentally, an image file may be generated as raw (RAW) image data.

In addition, the digital signal processing unit 20 generates image data converted to a low resolution for live view display, for example, by performing resolution conversion processing on the image data resulting from the various kinds of signal processing.

A memory unit 27 represents a buffer memory of the image data. The memory unit 27 is, for example, formed by a D-RAM (Dynamic Random Access Memory).

The image data processed by the digital signal processing unit 20 is temporarily stored in the memory unit 27, and is transferred to a display unit 15, a recording control unit 14, or a communicating unit 16 in predetermined timing.

The recording control unit 14 performs recording and reproduction on a recording medium formed by a nonvolatile memory, for example. The recording control unit 14, for example, performs processing of recording an image file of moving image data, still image data, or the like on the recording medium.

Actual forms of the recording control unit 14 are variously conceivable. For example, the recording control unit 14 may be configured as a flash memory included in the imaging device 1 and a writing/reading circuit thereof. In addition, the recording control unit 14 may be in a form of a card recording and reproducing unit that makes recording and reproduction access to a recording medium detachable from the imaging device 1, for example, a memory card (portable flash memory or the like). In addition, the recording control unit 14 may be implemented as an HDD (Hard Disk Drive) or the like as a form included in the imaging device 1.

The display unit 15 is a display unit that makes various kinds of display for the imaging person. The display unit 15 is, for example, a display panel or a viewfinder formed by a liquid crystal panel (LCD: Liquid Crystal Display), an organic EL (Electro-Luminescence) display, or the like disposed in a casing of the imaging device 1.

The display unit 15 makes various kinds of display on a display screen on the basis of instructions of a camera control unit 21.

For example, the display unit 15 displays a reproduced image of image data read from the recording medium in the recording control unit 14.

In addition, the display unit 15 is supplied with the image data of an imaged image converted in resolution for display in the digital signal processing unit 20, and makes display corresponding thereto, for example, display of a live view image.

In addition, the display unit 15 makes display of a menu of various kinds of operation, an icon, a message, or the like, that is, makes display as a GUI (Graphical User Interface) on the screen on the basis of an instruction of the camera control unit 21.

The communicating unit 16 performs data communication and network communication to and from an external apparatus by wire or wirelessly.

For example, image data (a still image file or a moving image file) or metadata is transmitted and output to an external information processing device, an external display device, an external recording device, an external reproducing device, or the like.

In addition, the communicating unit 16 can perform, as a network communicating unit, various kinds of network communications using, for example, the Internet, a home network, a LAN (Local Area Network), or the like, and thereby transmit and receive various kinds of data to and from a server, a terminal, or the like on a network.

An operating unit 17 comprehensively represents input devices for the user to perform various kinds of operating input. Specifically, the operating unit 17 represents various kinds of operating elements (keys, dials, a touch panel, a touch pad, and the like) arranged in the casing of the imaging device 1. The operating elements include a shutter button for still image imaging, for example.

The operating unit 17 detects an operation of the user. A signal corresponding to the input operation is sent to the camera control unit 21.

The camera control unit 21 is formed by a microcomputer (arithmetic processing device) including a CPU (Central Processing Unit). This camera control unit 21 is an imaging control device that controls the operation of the imaging device 1.

A memory unit 19 stores information used for processing by the camera control unit 21 and the like. The memory unit 19 illustrated in the figure comprehensively represents, for example, a ROM (Read Only Memory), a RAM (Random Access Memory), a flash memory, and the like.

The memory unit 19 may be a memory area included in a microcomputer chip as the camera control unit 21, or may be formed by a separate memory chip.

The camera control unit 21 controls the whole of the imaging device 1 by executing a program stored in the ROM, the flash memory, or the like of the memory unit 19.

For example, the camera control unit 21 gives instructions for various kinds of signal processing in the digital signal processing unit 20 and controls an imaging operation, a recording operation, an operation of reproducing a recorded image file, or the like in response to an operation of the user.

In addition, as automatic exposure control, the camera control unit 21 controls the operation of the diaphragm mechanism, controls a shutter speed of the imaging element 12, and controls an AGC gain in the analog signal processing unit 13.

In addition, the camera control unit 21 performs autofocus control or driving control of the focus lens or the zoom lens in response to a manual focus operation, a zoom operation, or the like.

In addition, the camera control unit 21 controls the shutter speed, light exposure timing, or the like in the imaging element 12.

The RAM in the memory unit 19 is used to store data, a program, or the like temporarily as a work area at times of various kinds of data processing by the CPU of the camera control unit 21.

The ROM and the flash memory (non-volatile memory) in the memory unit 19 are used to store an OS (Operating System) for the CPU to control various parts, application programs for various kinds of operations, firmware, various kinds of setting information, and the like.

The various kinds of setting information include communication setting information, setting information related to imaging operation, setting information related to image processing, and the like. The setting information related to imaging operation includes an exposure setting, a shutter speed setting, a curtain speed setting of a mechanical shutter or an electronic shutter, a mode setting, and the like.

A driver unit 22 is, for example, provided with a motor driver for a zoom lens driving motor, a motor driver for a focus lens driving motor, a motor driver for a diaphragm mechanism motor, and the like.

These motor drivers apply driving current to the corresponding drivers according to instructions from the camera control unit 21 to thereby perform the movement of the focus lens and the zoom lens, the opening and closing of a diaphragm blade of the diaphragm mechanism, and the like.

FIG. 2 illustrates functions of the camera control unit 21 which functions are related to display control according to the present disclosure.

Incidentally, in FIG. 2, thin lines represent respective paths of control signals, broken lines represent respective paths of synchronizing signals, and thick lines represent respective paths of image data.

The camera control unit 21 includes a software control block 31, an image sensor control block 32, a display control block 33, and a memory controller 34 as control modules implemented by a program.

The software control block 31 is a module that presides over the display control according to the present disclosure. The software control block 31 performs the display control of a live view image, a blackout free operation at a time of the display control, calculation of displayable timing and accompanying control in a case where an operation for still image imaging and recording is performed, and the like.

The image sensor control block 32 controls light exposure/readout operation in the imaging element 12 according to the control of the software control block 31. In addition, for this purpose, the image sensor control block 32 supplies a sensor synchronizing signal SensV to the imaging element 12. The sensor synchronizing signal SensV is a synchronizing signal for the imaging operation of the imaging element 12. The timing of the sensor synchronizing signal SensV is variably set by the control of the camera control unit 21.

The display control block 33 controls display operation in the display unit 15 according to the control of the software control block 31. In particular, the display control block 33 performs the display control of a live view image, control as a blackout free operation at a time of an operation for still image imaging and recording, display setting processing based on the calculated displayable timing, and the like. In addition, for this purpose, the display control block 33 supplies a display synchronizing signal SysV to the display unit 15. The display synchronizing signal SysV is a synchronizing signal for the display operation of the display unit 15. The display synchronizing signal SysV has vertical timing of a predetermined frame rate. As for live view images, image display of each frame is made in timing according to the display synchronizing signal SysV.

The memory controller 34 controls the writing/reading of the image data in the memory unit 27 according to the control of the software control block 31.

An image signal obtained by light exposure/readout in the imaging element 12 as described above is supplied as image data to the digital signal processing unit 20 via the analog signal processing unit 13 and the temporary storage unit 26, which are not illustrated in FIG. 2.

The imaging element 12 performs the light exposure and the readout in timing according to the control of the image sensor control block 32.

The digital signal processing unit 20 stores the image data resulting from performing necessary processing in the memory unit 27. The image data stored in the memory unit 27 is read, and the display unit 15 makes live view display of the image data. A display operation at this time is performed on the basis of a display setting of the display control block 33. In addition, the readout timing and readout address of the image data from the memory unit 27 and the like are set by the memory controller 34 on the basis of the control of the software control block 31.

Processing related to the display of a live view image by the functions of this FIG. 2 will be described later in detail.

In the following, flows of data processing at a time of display of a live view image during a wait for still image recording or the like and at a time of recording a captured image will be described with reference to FIGS. 3A and 3B.

In each figure, an arrow LV indicates a flow of live view image data, and an arrow CAP indicates a flow of captured image data.

Figure 3A:
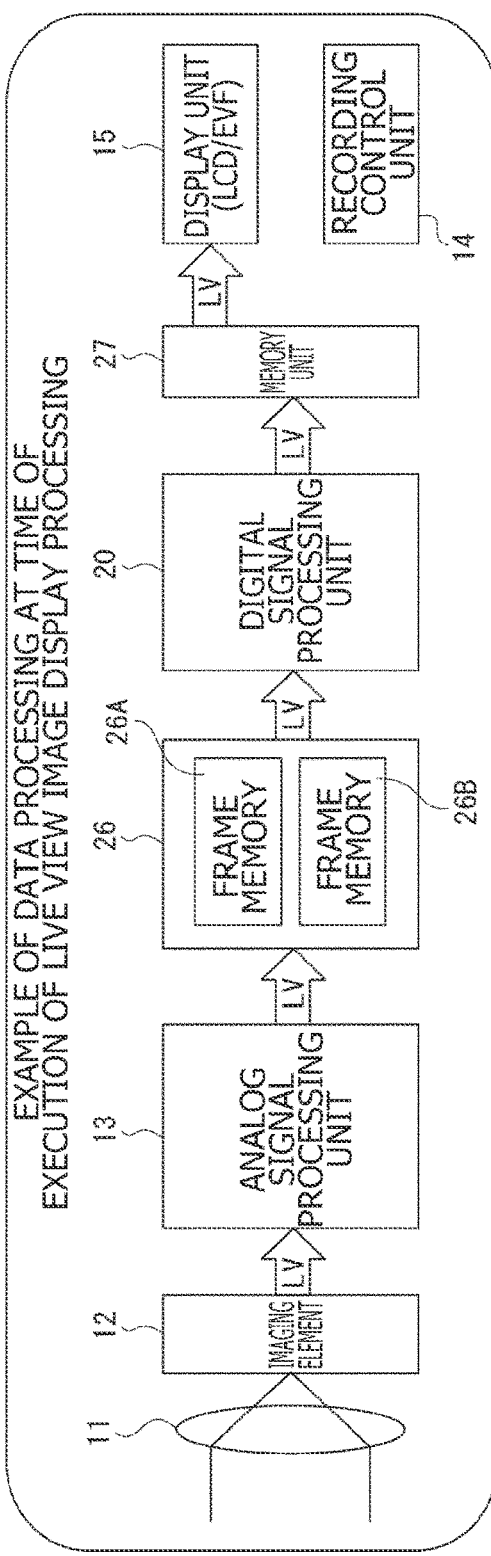
FIGS. 3A and 3B are diagrams of assistance in explaining flows of processing at a time of a wait for recording and at a time of capture.

First, FIG. 3A illustrates a flow of processing at a time of making live view image display while waiting for a release operation or a moving image recording start operation.

Light made incident via the imaging optical system 11 enters the imaging element 12. The imaging element 12 outputs an image signal resulting from photoelectric conversion.

Incidentally, the image signal in this case is an image signal having a relatively low resolution for live view display. For example, when the imaging element 12 outputs an image signal for live view display, the imaging element 12 outputs a partially thinned-out pixel signal having a low number of pixels without outputting all pixels.

When an image signal for recording is to be output on the basis of capture light exposure, on the other hand, it is necessary to generate an image for recording which image has a high number of pixels, and therefore a pixel signal of substantially all of the pixels of the imaging element 12 is output.

In FIG. 3A, the image signal from the imaging element 12 is processed by the analog signal processing unit 13, and is supplied as a digital signal to the temporary storage unit 26. The image data digitized as described above is alternately stored in the frame memories 26A and 26B on a frame-by-frame basis. Then, the image data stored in the temporary storage unit 26 is sequentially output to the digital signal processing unit 20, starting with a preceding stored frame. The digital signal processing unit 20 generates image data for live view display by performing necessary processing, and stores the image data in the memory unit 27. The display unit 15 displays the LV image stored in the memory unit 27.

Figure 3B:
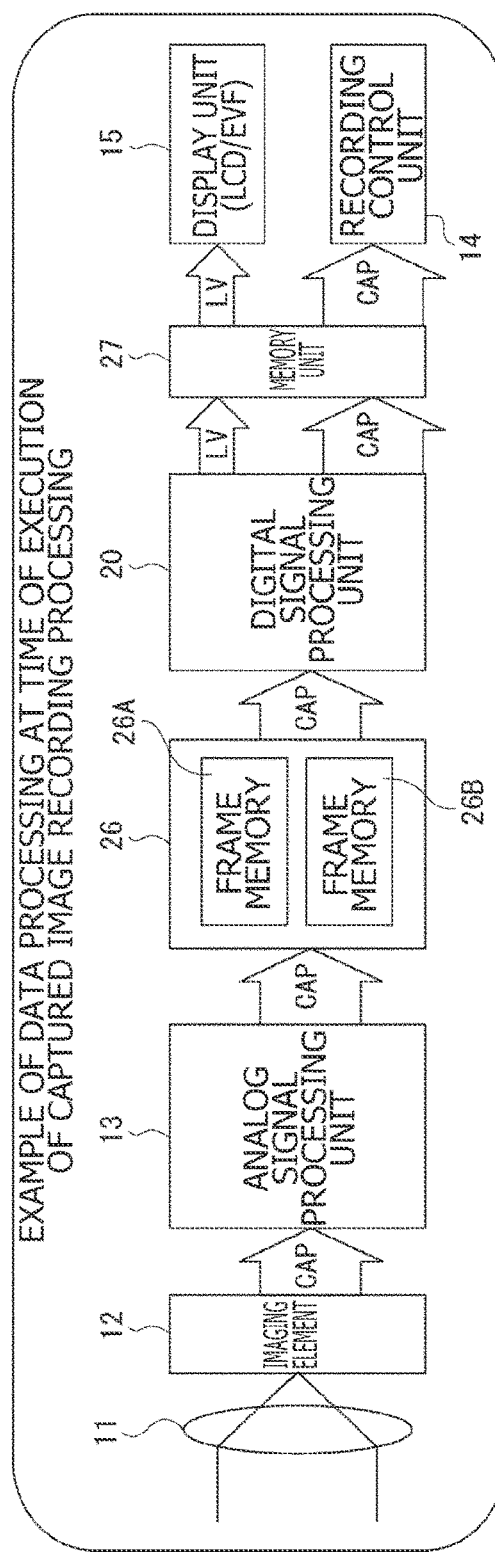

FIG. 3B illustrates a flow of data processing at a time of recording a captured image. The processing of FIG. 3B is performed when the user performs a release operation, for example.

When the user performs a release operation, light made incident via the imaging optical system 11 enters the imaging element 12, and light exposure processing is started. However, after the release operation, there is a certain time interval, that is, a release time lag before the light exposure processing in the imaging element 12 is started. The time is, for example, approximately 15 msec to approximately 30 msec.

When the light exposure processing in the imaging element 12 is completed, the imaging element 12 outputs an image signal resulting from photoelectric conversion to the analog signal processing unit 13. The image signal in this case is an image signal having a high resolution for still image recording, for example. Incidentally, in FIGS. 3A and 3B, the arrows LV are illustrated as thin arrows, and the arrows CAP are illustrated as thick arrows. This is intended to express the numbers of pixels of the image signals by the thickness of the arrows.

Image data converted into a digital signal in the analog signal processing unit 13 is processed in the digital signal processing unit 20 via the temporary storage unit 26. In this case, the digital signal processing unit 20 generates image data having a high resolution for recording, and also generates image data having a low resolution for live view display. The digital signal processing unit 20 stores both of the image data for recording and the image data for live view display in the memory unit 27. Then, the image data for recording is transferred to the recording control unit 14 to be subjected to recording processing. The image data for live view display is transferred to the display unit 15 to be used for live view display.

As described above, live view display is made in a state before the release operation for still image recording and at a time of the release operation. However, there is a phenomenon (blackout) in which the display of the live view image is interrupted in timing after the release.

Description will be made of processing that prevents the live view image from being blacked out and interrupted.

When the release operation is performed during the light exposure of the live view image, the camera control unit 21 makes the imaging element 12 interrupt the light exposure of the live view image, and gives an instruction for a mode change to the imaging element 12. For example, an instruction to change readout pixels, resolution, or the like is given to perform the capture light exposure. Then, after a preparation for the capture light exposure is completed, the camera control unit 21 makes the imaging element 12 start the capture light exposure.

In a flow of such operation, the light exposure of the live view image which light exposure is being performed in release operation timing is interrupted. Consequently, the live view image of the frame cannot be displayed, so that a blackout occurs. The blackout continues until the capture light exposure is performed and the frame of the live view image based on the capture light exposure as in FIG. 3B is displayed.

As one method for preventing such a blackout, there is a method of not interrupting the light exposure of the live view image which light exposure is being performed in the release operation timing. That is, a wait is made for completion of the light exposure of the live view image which light exposure is being performed in the release operation timing without interrupting the light exposure, and the image data is stored in the frame memory 26A, for example. The live view image of the frame can be consequently displayed.

After the light exposure of the live view image is completed, a preparation for the capture light exposure is made, and the capture light exposure is performed after the preparation. Image data resulting from the capture light exposure is stored in the frame memory 26B. Then, during a period before the live view image data based on the image data resulting from the capture light exposure can be generated, the display of the live view image can be continued by using the image data in the frame memory 26A. The blackout is thereby prevented.

There is another method for preventing the blackout. For example, when the release operation is performed while the light exposure of the live view image is performed and the frame memory 26B is written, the light exposure is interrupted, and a latest image already stored in the frame memory 26A (for example, the image data of a frame immediately preceding a frame whose light exposure is interrupted) is copied to the frame memory 26B. Then, the display of the live view image is continued on the basis of the image from the frame memory 26B. At this time, image data resulting from the capture light exposure is written to the frame memory 26A. After completion of the capture light exposure, the live view image based on the image data resulting from the capture light exposure is displayed.

By thus using the frame memories 26A and 26B, it is possible to prevent the live view image from being interrupted at the time of the release operation.

In addition, similar processing can make the live view image continue to be displayed also during consecutive-shot imaging, for example.

During the consecutive-shot imaging, the capture light exposure is repeated in a predetermined cycle. In a case where the cycle of the capture light exposure is longer than the cycle of one frame based on the frame rate of the live view image, one or multiple times of inter-frame light exposure are performed between a capture light exposure and a capture light exposure.

For example, light exposure operations such as a "capture light exposure," an "inter-frame light exposure," an "inter-frame light exposure," a "capture light exposure," an "inter-frame light exposure," an "inter-frame light exposure" . . . are repeated until consecutive photographing is ended.

In this case, when control similar to that in the above-described release operation timing is performed at a time of switching from an inter-frame light exposure to a capture light exposure, the live view image can be displayed without a blackout being caused during the consecutive photographing.

2. FOLLOW-UP DISPLAY AND PHASE RELATION DURING STILL IMAGE IMAGING

The processing that prevents a blackout from occurring as described above is referred to also as blackout free processing. A subject image in the viewfinder or the display panel is not interrupted even during consecutive-shot imaging, for example, by introducing the blackout free processing. The blackout free processing is suitable for photographing a moving subject while following the moving subject, for example. However, display response may be decreased at a time of still image imaging and recording (consecutive-shot imaging or single-shot imaging) in response to the release operation. This will be described in the following.

During monitoring display of the live view image in a period of waiting for the release operation of the user, the image can be displayed with good responsiveness by making "follow-up display" for the output of the imaging element 12. A state of making this follow-up display is illustrated in FIG. 4.

FIG. 4 illustrates the sensor synchronizing signal SensV, the light exposure/readout operation of the imaging element 12, memory readout (operation of reading out image data from the memory unit 27), software control related to display by the camera control unit 21, the display synchronizing signal SysV, and screen display.

Incidentally, "LV1," "LV2," . . . are illustrated so as to correspond to respective frames of live view images. For example, a period given "LV1" in operation of the imaging element 12 represents an operation of the light exposure/readout of the frame of a live view image LV1, a period given "LV1" in memory readout represents a period for reading out the image data of the live view image LV1 from the memory unit 27, and a period given "LV1" in screen display represents a period in which the image of the frame of the live view image LV1 is displayed.

In this case, in order to make display according to execution of the light exposure/readout of the live view image LV1 by the imaging element 12, for example, the camera control unit 21 having the functions of FIG. 2 makes a readout setting RS and a display reservation DR.

With the readout setting RS at a time of the light exposure of the live view image LV1, the readout of a pixel signal from the imaging element 12 is performed in the timing of a next sensor synchronizing signal SensV (time t10). Image data based on the read pixel signal is processed by the digital signal processing unit 20 and is written to the memory unit 27.

In addition, together with the readout setting RS, a display reservation DR, and a display setting DS are made.

Here, the display reservation DR is processing in which the software control block 31 in FIG. 2 gives a display instruction to the display control block 33. The display setting DS illustrates processing in which the display control block 33 makes a setting of readout timing of the image data of the live view image LV1 from the memory unit 27 and a setting for display from the timing of a next display synchronizing signal SysV according to the display reservation.

With such control, after a start of writing of the image data of the live view image LV1 to the memory unit 27, a readout is started before the writing is completed, and the display of the live view image LV1 is started in the timing of the display synchronizing signal SysV at a time t11.

That is, the frame of the live view image LV1 is sequentially written to the memory unit 27 from a first line. The readout is sequentially performed from the first line so as to follow the writing, and the frame of the live view image LV1 is supplied to the display unit 15 and subjected to display processing.

By thus making the "follow-up display" that reads and displays the image data from the memory unit 27 so as to follow the readout of the pixel signal from the imaging element 12 and the writing of the pixel signal to the memory unit 27, it is possible to display the image of one frame with a very small time difference from the light exposure timing.

The follow-up display is similarly performed as illustrated in the figure also for the frames of a next live view image LV2 and subsequent live view images. Hence, the user can check the subject as a live view image of the display unit 15 with a very small time difference.

Here, the follow-up display can be properly made in such a manner because a phase relation between the sensor synchronizing signal SensV and the display synchronizing signal SysV is held constant. In the example of FIG. 4, the display synchronizing signal SysV maintains a phase relation in which the display synchronizing signal SysV is delayed by an amount of a display system delay DL1 with respect to the sensor synchronizing signal SensV.

Because this phase relation is maintained, control is possible which starts display in the timing of the nearest display synchronizing signal SysV while performing a readout that does not overtake written data after a start of writing to the memory unit 27.

However, this phase relation is not maintained when an operation for still image imaging and recording as consecutive-shot imaging or single-shot imaging is performed.

In a case of still image imaging and recording, responsiveness to a start of imaging (for example, a depression of the shutter button) is regarded as important. It is thus preferable to make a transition from a live view display state to a still image imaging and recording operation most quickly in response to the start of the imaging. Therefore, when a capture light exposure for the still image imaging and recording is performed, the phases of the sensor synchronizing signal SensV and the display synchronizing signal SysV are not held constant. In addition, in a case of consecutive-shot imaging, the phase relation changes each time a capture light exposure is performed.

Accordingly, the follow-up display is usually not made during the still image imaging and recording. This is because the phase relation is not constant and thus makes it difficult to control timing of readout from the memory unit 27 for proper follow-up display, for example.

FIG. 5 illustrates a control state at a time of performing still image imaging and recording.

As with FIG. 4, FIG. 5 indicates that until times t10, t20, and t30, live view images LV1, LV2, and LV3 are respectively read from the imaging element 12, and the follow-up display is made.

Suppose in this case that the user performs a release operation at time tx.

As the software control of the camera control unit 21, processing of switching to asynchronous photographing is first performed in response to this release operation. Specifically, processing of switching from light exposure/readout for live view in the imaging element to light exposure/readout for still image recording or the like is performed.

In addition, the camera control unit 21 performs control for the above-described blackout free operation with regard to display after the switching processing.

Incidentally, "CP1" in FIG. 5 denotes a captured image after the release operation. As with "LV1" and "LV2" described above, a period given "CP1" in operation of the imaging element 12 represents an operation of the light exposure/readout of the frame of a captured image CP1, a period given "CP1" in memory readout represents a period for reading out the captured image CP1 as a live view image from the memory unit 27, and a period given "CP1" in screen display represents a period in which the live view image based on the captured image CP1 is displayed.

In the example of FIG. 5, the phase of the sensor synchronizing signal SensV is varied at time t50 after the switching processing, so that the light exposure/readout of the imaging element 12 is started at as early a time point as possible after the release operation.

Thereafter, the captured image CP1 is read from the memory unit 27, and then the live view image based on the captured image CP1 is displayed. The follow-up display is not made at this time.

Incidentally, during a period before the captured image CP1 is displayed, the live view image LV3, for example, continues to be displayed over multiple frame periods as the blackout free operation.

Thus, in the case where responsiveness to the start of the imaging (for example, the depression of the shutter button) is regarded as important, and the processing that does not maintain the synchronous relation is performed, the image data is read and displayed after being written to the memory unit 27 without the follow-up display being made. Then, in this case, frame missing may occur depending on timing. That is, a certain frame is not displayed, and thus the live view images are not displayed smoothly.

In addition, after writing to the memory unit 27, when readout timing adjustment is further made to stabilize display timing, a display delay is increased.

From the above, as compared with live view display during a wait for a release, a delay is conspicuous in display at a time of still image imaging and recording. The user may therefore have a feeling of strangeness at a time of following a moving subject or the like.

Accordingly, the embodiment improves display latency by devising timing of display processing and display control while attaching importance to responsiveness as described above and not maintaining the phase relation between the sensor synchronizing signal SensV and the display synchronizing signal SysV.

3. DISPLAY CONTROL

The display control according to the embodiment will be described with reference to FIG. 6.

This is processing in which before a start of readout of a pixel signal from the imaging element 12 at a time of still image imaging and recording, the camera control unit 21 calculates the displayable timing of the frame and makes a display reservation, and makes a display setting accordingly, so that the follow-up display can be made. A display delay during still image imaging and recording as consecutive-shot imaging or single-shot imaging is thereby minimized.

Figure 6:
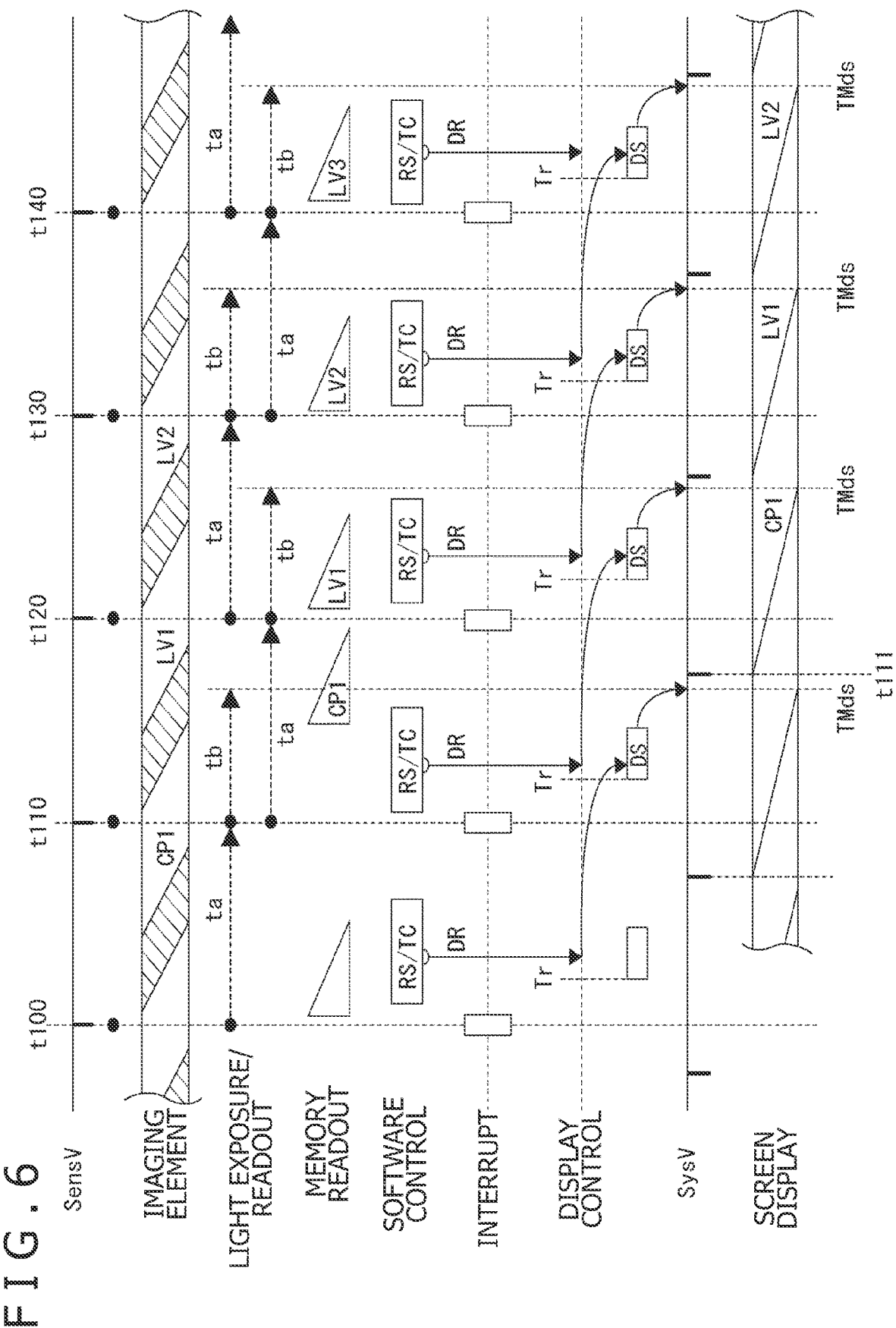
FIG. 6 is a diagram of assistance in explaining display control at a time of still image imaging and recording according to the embodiment.

FIG. 6 illustrates a period in a case where a release operation is performed, and still image imaging and recording as consecutive-shot imaging or single-shot imaging is performed. This is a period subsequent to a period in which live view display is made during a wait for the release operation, as described above.

Then, a case is illustrated in which from time t100 onward, the light exposure/readout of the captured image CP1 is performed, and thereafter the light exposure/readout of live view images LV1, LV2, . . . as images between frames of consecutive photographing is performed.

FIG. 6 illustrates the sensor synchronizing signal SensV, the light exposure/readout operation of the imaging element 12, memory readout (operation of reading out image data from the memory unit 27), software control related to display by the camera control unit 21, display control, the display synchronizing signal SysV, and screen display.

As for the light exposure/readout of the imaging element 12, a light exposure period ta and a readout period tb are indicated by broken line arrows. For example, as for the light exposure/readout of the captured image CP1, the light exposure period ta in the imaging element 12 is started by an interrupt in the timing of the sensor synchronizing signal SensV at time t100, and then the readout period tb of a pixel signal is started in the timing of the sensor synchronizing signal SensV at subsequent time t110. Incidentally, actual light exposure and readout periods vary according to the shutter speed, and therefore the light exposure does not necessarily continue to be performed during the light exposure period ta indicated by the broken line.

The software control of the camera control unit 21 in FIG. 6 represents mainly the processing of the software control block 31. In particular, a readout setting RS, a timing calculation TC, and a display reservation DR are schematically illustrated. During the light exposure period ta, the camera control unit 21 makes the readout setting RS, the timing calculation TC, and the display reservation DR for a frame during the light exposure.

The readout setting RS is setting processing for reading a pixel signal from the imaging element 12 in the timing of a next sensor synchronizing signal SensV.

The timing calculation TC is processing of calculating displayable timing TMds for the frame (captured image CP1) for which the light exposure is currently being performed. This displayable timing TMds is calculated so as to take the light exposure period ta and the readout period tb into consideration and so as to maintain a necessary amount of delay so that a readout operation does not overtake a writing operation in the memory unit 27 in the follow-up display.

The display reservation DR is processing in which the software control block 31 notifies the calculated displayable timing TMds to the display control block 33, and gives an instruction for display processing to the display control block 33.

The display control in FIG. 6 refers to the display setting DS made by the display control block 33.

The display setting DS is processing of making a register setting and a setting related to a readout from the memory unit 27 or the like so as to start display in the timing of a display synchronizing signal SysV near the displayable timing TMds in consideration of the displayable timing TMds received from the software control block 31.

With regard to this display setting DS, closing timing Tr for assuming that display is performed at a next display synchronizing signal SysV is set. This is to assume a time taken for the display setting, and prevent an image collapse from occurring even when display is started in the timing of the next display synchronizing signal SysV.

When the display reservation DR is received before the closing timing Tr, the display control block 33 can make a setting so as to start display in the timing of the next display synchronizing signal SysV.

Specifically, as the display setting DS, a necessary setting is made so that display is made in the timing of the display synchronizing signal SysV near the displayable timing TMds according to the timings of the closing timing Tr and the display reservation DR.

In the example of FIG. 6, as processing from time t100 onward, the camera control unit 21 makes the readout setting RS, the timing calculation TC, and the display reservation DR in the light exposure period ta in which the light exposure of the captured image CP1 is performed. Suppose that the displayable timing TMds in this case is timing slightly before time t111.

The camera control unit 21 makes the display setting DS for the captured image CP1 at a time after time t110 in response to the display reservation DR.

This means that display is enabled to be started in a shortest time when a timing relation between the closing timing Tr and the display reservation DR is considered and the displayable timing TMds is considered.

When the displayable timing TMds is identified during the light exposure in advance, and the display setting is made, control of readout of image data from the memory unit 27 for the follow-up display also becomes possible. Thus, the follow-up display is assumed to be performed, and display is started in nearest timing.

Hence, display latency can be improved by appropriately making the follow-up display while giving priority to responsiveness without maintaining a synchronous relation in response to the release operation.

Similar processing is performed also after starts of light exposures of live view images LV1, LV2, . . . following the captured image CP1, and the follow-up display is continued.

Consequently, live view display with good responsiveness can be provided even during the consecutive-shot imaging.

Figure 7A:
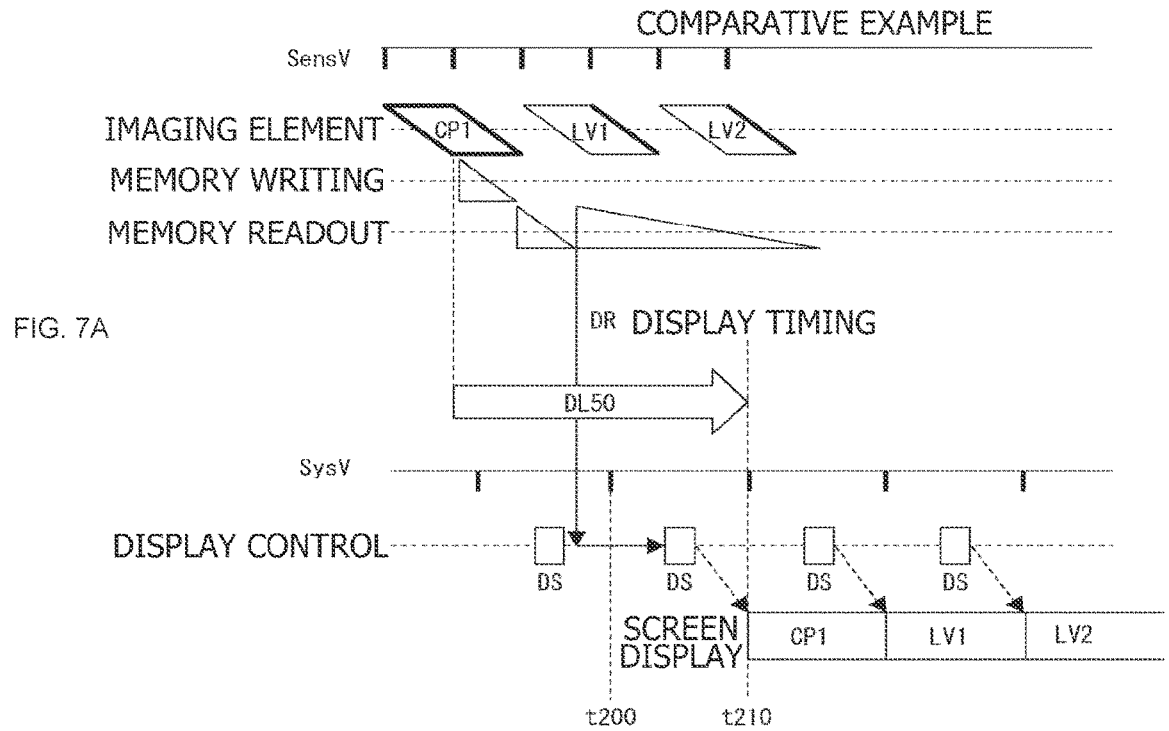
FIGS. 7A and 7B are diagrams of assistance in explaining differences between display states according to a comparative example and the embodiment.
Figure 7B:
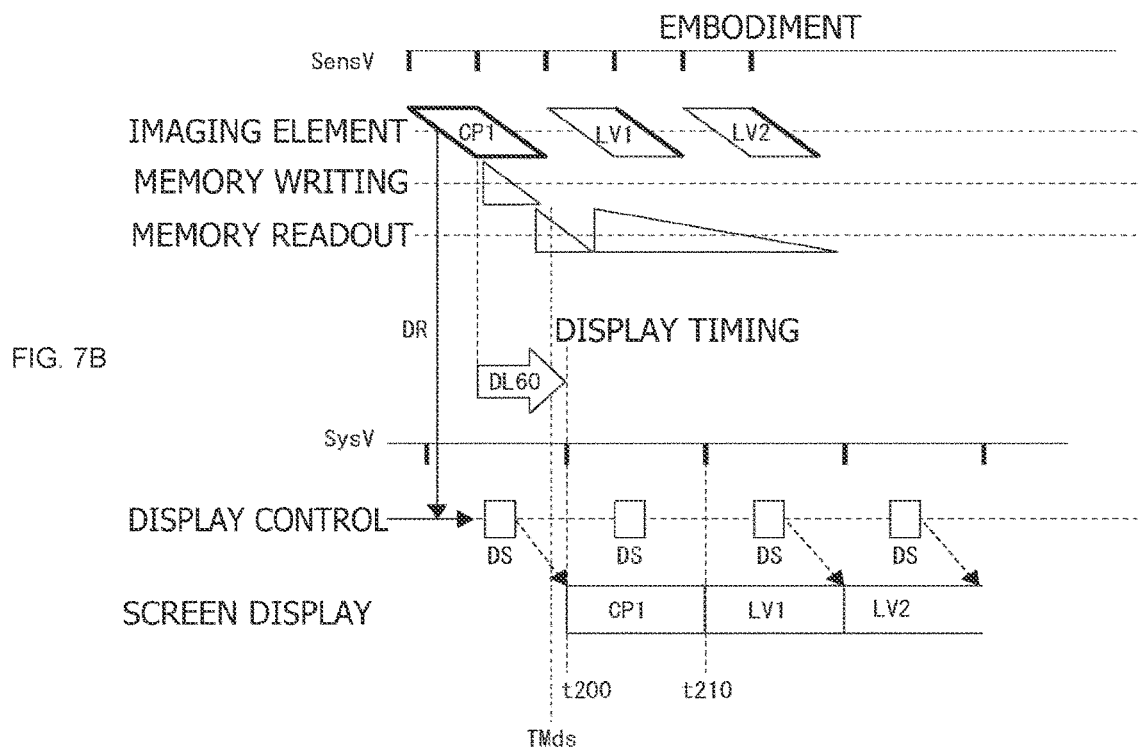

FIGS. 7A and 7B illustrate differences between operation of a comparative example and operation of the embodiment.

FIG. 7A illustrates an example in which the follow-up display for the captured image CP1 is not made as a comparative example. FIG. 7B illustrates an example in which the follow-up display is made by performing control as in FIG. 6 described above.

In the case of FIG. 7A, a wait is made for writing/readout of the memory unit 27, the display reservation DR is then made, and the display setting DS is made accordingly. Consequently, the display of the captured image CP1 is made in the timing of a display synchronizing signal SysV at time t210. A delay DL50 from an end of the light exposure to the display is lengthened.

In the case of FIG. 7B, the displayable timing TMds is notified in the display reservation DR in advance, the display setting DS is made, and the follow-up display is made. Consequently, the display of the captured image CP1 can be made in the timing of a display synchronizing signal SysV at time t200. A delay DL60 from an end of the light exposure to the display is shorter than the delay DL50 in the comparative example.

4. ADJUSTMENT PROCESSING

Now, in the processing according to the embodiment as described above, there is a possibility that the displayable timing TMds coincides with the timing of the display synchronizing signal SysV or precedes or succeeds the timing of the display synchronizing signal SysV with a very small time difference.

If such conditions occur, the live view display may become non-smooth.

FIG. 8 illustrates a state in which the displayable timing TMds is very near the timing of the display synchronizing signal SysV when the imaging of the captured image CP1 and the live view images LV1, LV2, . . . between frames is performed from time t100 onward as in FIG. 6.

Specifically, supposing that there is a variation of ±500 μs as timing errors of various kinds of processing, the displayable timing TMds is assumed to be in a proximity state in a case where the displayable timing TMds is within a period of ±1 ms from the timing of the display synchronizing signal SysV.

In such a case, when the control timing variation is assumed, a situation can occur in which the captured image CP1 is displayed over a period of two frames and the live view image LV1 is lost, as illustrated in the figure. This degrades quality of the live view display as a smooth moving image.

Specifically, in the present example, the displayable timing TMds of the captured image CP1 is assumed to be timing within 1 ms immediately before the display synchronizing signal SysV at time t111.

In this case, the captured image CP1 can be displayed. However, in the case of such close timing, the displayable timing TMds may be timing slightly after the display synchronizing signal SysV at a next time t121, as illustrated in the figure, in the frame of the next live view image LV1 due to the control timing variation. The figure illustrates a state in which the frame of the live view image LV1 cannot be displayed properly and the display of the captured image CP1 is thereby extended in such a case.

Accordingly, in a case where the displayable timing TMds is in proximity to the timing of the display synchronizing signal SysV as described above, adjustment processing of adjusting the displayable timing TMds is performed.

As illustrated in FIG. 9 and FIG. 10, a period of ±1 ms from the timing of the display synchronizing signal SysV is set as an adjustment target period KK.

FIG. 9 illustrates a case where the displayable timing TMds for the captured image CP1 is within 1 ms immediately before the display synchronizing signal SysV, and corresponds to the adjustment target period KK.

In this case, the camera control unit 21 adjusts the displayable timing TMds, and sets the adjusted displayable timing TMds as post-adjustment displayable timing aTMds. Specifically, timing obtained by adding a time from the displayable timing TMds to the display synchronizing signal SysV and a time of 1 ms (or the time may slightly exceed 1 ms) to the displayable timing TMds is set as the post-adjustment displayable timing aTMds. That is, the post-adjustment displayable timing aTMds is set to be outside the adjustment target period KK.

In a case where an adjustment is thus made for the first captured image CP1, the adjustment processing of adjusting the displayable timing TMds to the post-adjustment displayable timing aTMds is made also for the subsequent live view images LV1, LV2, . . . .

Incidentally, suppose that as for the second and subsequent live view images LV1, LV2, . . . following the first captured image CP1, the adjustment processing is made even when the displayable timing TMds does not correspond to the adjustment target period KK.

When a display setting is made by using such post-adjustment displayable timing aTMds, the display of the captured image CP1 is made from the timing of a display synchronizing signal SysV at time t121 in the case illustrated in FIG. 9.

That is, as is understood by comparison with FIG. 8, the display of the captured image CP1 is delayed by one frame period. However, when the display setting based on the post-adjustment displayable timing aTMds is made as in FIG. 9, the following live view image LV1 can be displayed appropriately from the timing of a display synchronizing signal SysV at time t131, and is not lost as in FIG. 8. That is, the adjustment processing can prevent an extension of a certain frame and a loss of a certain frame in the live view display.

FIG. 10 illustrates a case where the displayable timing TMds for the captured image CP1 is within 1 ms immediately after the display synchronizing signal SysV, and corresponds to the adjustment target period KK.

Also in this case, the camera control unit 21 adjusts the displayable timing TMds, and sets the adjusted displayable timing TMds as post-adjustment displayable timing aTMds. Specifically, timing obtained by adding a time of 1 ms (or the time may slightly exceed 1 ms) to the displayable timing TMds is set as the post-adjustment displayable timing aTMds. That is, the post-adjustment displayable timing aTMds is set to be outside the adjustment target period KK.

In a case where an adjustment is thus made for the first captured image CP1, the adjustment processing of adjusting the displayable timing TMds to the post-adjustment displayable timing aTMds is made also for the subsequent live view images LV1, LV2, . . . .

Also in this case, suppose that as for the second and subsequent live view images LV1, LV2, . . . following the first captured image CP1, the adjustment processing is made even when the displayable timing TMds does not correspond to the adjustment target period KK.

When the display setting is made by using the post-adjustment displayable timing aTMds, the display of the captured image CP1 is made from the timing of a display synchronizing signal SysV at time t121 in the case illustrated in FIG. 10, as in FIG. 9. Then, the display of the subsequent live view images LV1, LV2, . . . is not omitted.

Incidentally, when the adjustment processing is performed as in FIG. 9 and FIG. 10, a start of the display of the first captured image CP1 is delayed. However, because display is continued by the blackout free operation described above until immediately before the display of the first captured image CP1, the user does not easily recognize the delay. Instead, non-smooth display due to a frame loss is more conspicuous. Accordingly, in a case where the displayable timing TMds is in close proximity to the timing of the display synchronizing signal SysV as a rare case, thus performing the adjustment processing can be said to be preferable for display even when latency is sacrificed to some extent.

A concept as to how the adjustment processing is to be performed will be described in the following with reference to FIG. 11.

Supposing that the control timings of the display reservation DR, the display setting DS, and the like vary by a maximum of ±500 μs, it suffices to assume the following patterns (A), (B), and (C).

(A) a fluctuation of the first captured image CP1 is −50 μs from a reference
(B) a fluctuation of the first captured image CP1 is ±0 μs from the reference
(C) a fluctuation of the first captured image CP1 is +500 μs from the reference.

Figure 11:
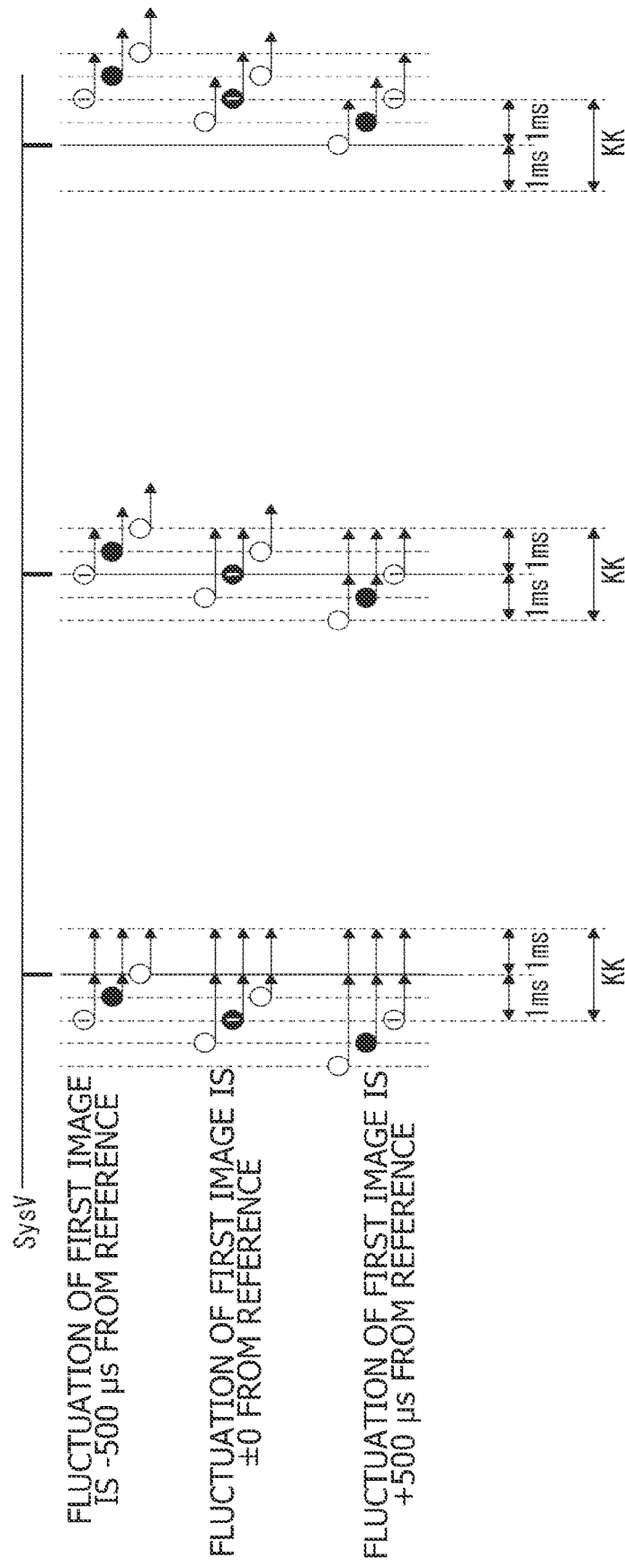
FIG. 11 is a diagram of assistance in explaining a concept of displayable timing adjustment according to the embodiment.

In FIG. 11, ● is set as reference timing, and states in which timing fluctuates forward and rearward of the reference timing by −500 ms and +500 ms are illustrated. As the timing of the first image, ○ or ● given "1" is illustrated.

A left side of the figure illustrates the above-described patterns (A), (B), and (C) as cases where the displayable timing is before the display synchronizing signal SysV and falls in the adjustment target period KK.

A center of the figure illustrates the above-described patterns (A), (B), and (C) as cases where the displayable timing coincides with the display synchronizing signal SysV.

A right side of the figure illustrates the above-described patterns (A), (B), and (C) as cases where the displayable timing is immediately after the display synchronizing signal SysV and falls in the adjustment target period KK.

In consideration of these, in a case where a range of ±1 ms is set as the adjustment target period KK, and the displayable timing TMds is before the display synchronizing signal SysV and falls in the adjustment target period KK, a value obtained by adding a time from the displayable timing TMds to the display synchronizing signal SysV and 1 ms or more is set as the post-adjustment displayable timing aTMds. In a case where the displayable timing TMds is after the display synchronizing signal SysV and falls in the adjustment target period KK, a value obtained by adding 1 ms or more to the displayable timing TMds is set as the post-adjustment displayable timing aTMds.

The timing adjustments in the respective cases are thus made as indicated by arrows in the figure, so that the post-adjustment displayable timing aTMds goes outside the adjustment target period KK in each case. Consequently, even when there are variations, frame missing and non-smooth display can be prevented.

FIG. 12 illustrates display setting processing including the adjustment processing by the camera control unit 21. The display setting processing can be considered to be the processing of the display control block 33 that has received a display reservation DR in the camera control unit 21, for example.

For example, the display control block 33 performs the adjustment processing from step S101 on down in response to reception of a display reservation DR from the software control block 31 in step S100.

In step S101, the display control block 33 branches the processing according to whether or not the present display reservation DR is for the first captured image CP1 of still image imaging and recording.

In a case of the display reservation DR for the first captured image CP1, the display control block 33 proceeds to step S102, where the display control block 33 determines whether or not the displayable timing TMds specified by the display reservation DR corresponds to within the adjustment target period KK.

When the displayable timing TMds is outside the adjustment target period KK, the display control block 33 proceeds to step S106, where the display control block 33 sets the specified displayable timing TMds as post-adjustment displayable timing aTMds as it is. That is, no substantial adjustment is performed.

When the displayable timing TMds is within the adjustment target period KK, the display control block 33 proceeds to step S103, where the display control block 33 retains information indicating that the displayable timing TMds falls in the adjustment target period KK. The display control block 33 thereafter proceeds to step S105.

In step S105, the display control block 33 obtains a difference between the timing of the display synchronizing signal SysV and the displayable timing TMds, and determines whether the displayable timing TMds is before or after the timing of the display synchronizing signal SysV.

In a case where the displayable timing TMds is immediately before the display synchronizing signal SysV, the display control block 33 proceeds to step S107, where the display control block 33 sets (Post-Adjustment Displayable Timing aTMds)=(Timing of Display Synchronizing Signal SysV)+1 ms. That is, a time point obtained by adding a time difference from the specified displayable timing TMds to the display synchronizing signal SysV and 1 ms to the displayable timing TMds is set as the post-adjustment displayable timing aTMds.

In a case where the displayable timing TMds is immediately after the display synchronizing signal SysV, the display control block 33 proceeds to step S108, where the display control block 33 sets (Post-Adjustment Displayable Timing aTMds)=(Displayable Timing TMds)+1 ms. That is, a time point obtained by adding 1 ms to the specified displayable timing TMds is set as the post-adjustment displayable timing aTMds.

When the received display reservation DR is for an image as a second live view image LV1 or a subsequent live view image, the display control block 33 proceeds from step S101 to step S104, where the display control block 33 determines whether or not substantial adjustment processing has been performed at the first image. That is, whether the information indicating that the displayable timing TMds falls in the adjustment target period KK is retained in step S103 is determined.

When no adjustment is performed at a time of the first image, the display control block 33 proceeds to step S109, where the display control block 33 sets the specified displayable timing TMds as the post-adjustment displayable timing aTMds as it is. That is, no substantial adjustment is performed.

In a case where the adjustment is performed at a time of the first image, the display control block 33 proceeds to step S105, where the display control block 33 determines whether the displayable timing TMds is before or after the timing of the display synchronizing signal SysV in a similar manner to the foregoing.

Then, the adjustment processing in one of step S107 and step S108 is performed according to a result of the determination.

After the display control block 33 performs one of steps S106, S107, S108, and S109 described above, the display control block 33 in step S110 performs processing of a display setting DS using the post-adjustment displayable timing aTMds.

As a result of the above processing, the adjustment processing as in FIG. 9 and FIG. 10 is performed on the basis of the concept described with reference to FIG. 11.

5. SUMMARY AND MODIFICATIONS

The imaging device 1 and the imaging control device (camera control unit 21) according to the foregoing embodiment can provide the following effects.

Before starting processing of reading a pixel signal forming a still image to be recorded from the imaging element 12 in a case where an operation (release operation or the like) of still image imaging and recording is performed, the camera control unit 21 as the imaging control device according to the embodiment calculates displayable timing TMds in the display unit 15 for the still image, and performs processing of a display setting DS according to the calculated displayable timing TMds.

By obtaining the displayable timing TMds in a stage before a start of a readout of the pixel signal obtained by light exposure, it is possible to make a display setting for captured data of the still image and a readout of image data from the memory unit 27 according to the timing of the display synchronizing signal SysV nearest the displayable timing TMds with regard to display control. That is, even in a state in which the timing of generation of a display image changes due to processing constraints of the imaging element 12 and software, display processing can be performed in suitable timing according to the displayable timing. Consequently, latency related to display at a time of still image imaging and recording can be improved.

In the embodiment, a case is illustrated in which image data of one frame based on the pixel signal read from the imaging element 12 is read from the memory unit 27 and used for display after being temporarily written to the memory unit 27. In that case, the camera control unit 21 performs control to start reading image data of a frame related to imaging after the operation for the still image imaging and recording from the memory unit 27 before completion of writing the image data of the frame to the memory unit 27.

By performing such "follow-up display," it is possible to display an imaged image as early as possible, and improve display response.

Because a first still image of consecutive-shot imaging or a still image of single-shot imaging is displayed as quickly as possible, a synchronous relation becomes non-constant, and therefore a disturbance of a display image is avoided by not performing a readout for the follow-up display. In the case of the present embodiment, however, the displayable timing TMds is calculated before a start of a readout of the pixel signal from the imaging element 12. It is therefore possible to determine memory readout start timing for the follow-up display. In other words, it is possible to set timing in which a readout from the memory unit 27 does not overtake writing to the memory unit 27.

That is, even in cases of consecutive-shot imaging and single-shot imaging, the follow-up display can be performed as in a period of live view display, and thereby a display delay at a time of still image imaging of consecutive photographing or single photographing can be minimized.

In the embodiment, an example has been described in which in a period of making live view display of an image imaged by the imaging element 12 without performing an operation of recording the image, a sensor synchronizing signal SensV defining a frame period of an imaging operation in the imaging element 12 and a display synchronizing signal SysV defining a frame period of a display operation in the display unit 15 are in a constant phase relation, and the phase relation is varied when the operation for the still image imaging and recording is performed.

A purpose in thus rendering the phase relation between the sensor synchronizing signal SensV and the display synchronizing signal SysV non-constant when a release operation is performed is to perform a capture light exposure in timing as close to release operation timing as possible. However, the follow-up display is consequently unable to be performed. In such a case, when display responsiveness is enhanced by obtaining the displayable timing TMds in a stage before a start of a readout of the pixel signal resulting from light exposure, a difference in display responsiveness from a time of monitoring of a live view image can be made inconspicuous.

That is, even in a state in which the phase relation between the sensor synchronizing signal SensV and the display synchronizing signal SysV varies at a time of the still image imaging and recording, display control can be realized which can make stable display with a minimum amount of delay according to timing of transfer of the display image from the imaging element 12. It is thereby possible to provide smooth display with a minimum amount of delay also at the time of the still image imaging and recording.

In the embodiment, an example is cited in which during a light exposure period ta of light exposure in the imaging element 12 in response to the operation for the still image imaging and recording, the camera control unit 21 performs calculation of the displayable timing TMds and processing of a display reservation DR that gives an instruction for a display setting DS according to the calculated displayable timing TMds.

Consequently, latency can be improved by obtaining the displayable timing TMds in a stage before a start of a readout of the pixel signal resulting from light exposure and making the display reservation DR.

In the embodiment, an example is cited in which the camera control unit 21 performs processing of a display setting DS such that display is made in the timing of a display synchronizing signal SysV identified according to an anteroposterior relation between closing timing Tr for each frame period based on the display synchronizing signal SysV in the display unit 15 and the timing of a display reservation DR that gives an instruction for the display setting DS in response to the calculation of the displayable timing TMds.

When display frame timing is identified by the closing timing Tr, a captured image is not necessarily displayed in an earliest frame. However, this leads to display of a stable image without causing, for example, an image collapse or the like.

In the embodiment, an example is cited in which the camera control unit 21 performs processing of continuing image display on the display unit 15 also in a period from a time of execution of the operation for the still image imaging and recording to execution of display based on the pixel signal forming the still image to be recorded.

That is, a feeling of strangeness due to an interruption of the live view image can be prevented from being caused to the user by making display in a blackout free state. Furthermore, images after the captured image can be displayed with good responsiveness.

In the embodiment, an example is cited in which the camera control unit 21 performs adjustment processing of adjusting the displayable timing TMds on the basis of a comparison between the displayable timing TMds and the timing of the display synchronizing signal SysV.

When the displayable timing TMds and the timing of the display synchronizing signal SysV coincide with each other or are in close proximity to each other, an image to be displayed may be lost, or images may become non-smooth. Accordingly, the displayable timing TMds is adjusted in order to be able to avoid such a state. It is thereby possible to avoid a degradation in quality of the display image, and realize stable display.

In the embodiment, an example is cited in which the camera control unit 21 sets a period from timing preceding the display synchronizing signal SysV by a predetermined time (for example, 1 ms) to the timing of the display synchronizing signal SysV as an adjustment target period KK, and when the displayable timing TMds is within the adjustment target period KK, the camera control unit 21 performs the adjustment processing of adjusting the displayable timing TMds.

Because of processing timing fluctuations (timing errors) due to various kinds of circumstances, it is appropriate to set also a period immediately before the display synchronizing signal SysV as an adjustment target. A degradation in display quality in a case where the displayable timing TMds is immediately before the display synchronizing signal SysV is thereby avoided.

In the embodiment, an example is cited in which when the displayable timing TMds is within the adjustment target period KK, the camera control unit 21 performs the adjustment processing such that a time exceeding a time from the displayable timing TMds to a nearest display synchronizing signal SysV is added to the displayable timing TMds. For example, an example is cited in which the adjustment processing is performed such that a time to the display synchronizing signal SysV and a fixed time (for example, 1 ms) are added to the displayable timing TMds.

Consequently, the post-adjustment displayable timing aTMds can be prevented from being in an adjacent period preceding or succeeding the display synchronizing signal SysV.

In the embodiment, an example is cited in which the camera control unit 21 sets a period from the timing of the display synchronizing signal SysV to a time point succeeding the timing of the display synchronizing signal SysV by a predetermined time (for example, 1 ms) as an adjustment target period KK, and when the displayable timing TMds is within the adjustment target period KK, the camera control unit 21 performs adjustment processing of adjusting the displayable timing TMds.

When processing timing fluctuations are assumed, it is appropriate to set also a period immediately after the display synchronizing signal SysV as an adjustment target. A degradation in display quality in a case where the displayable timing TMds is immediately after the display synchronizing signal SysV is thereby avoided.

In the embodiment, an example is cited in which when the displayable timing TMds is within the adjustment target period KK, the camera control unit 21 performs the adjustment processing such that a time equal to or more than a predetermined time (for example, 1 ms) is added to the displayable timing TMds.

Consequently, the post-adjustment displayable timing aTMds can be prevented from being in an adjacent period succeeding the display synchronizing signal SysV.

In the embodiment, an example is cited in which the operation for the still image imaging and recording is an operation for consecutive-shot imaging.

A degradation in responsiveness of display at a time of consecutive-shot imaging can be thereby avoided. Particularly when the consecutive-shot imaging is performed while following a moving subject, the user tends to feel a display delay. However, the technology according to the embodiment makes it possible to avoid causing the user to have a feeling of such delay.

Incidentally, also in a case of single-shot imaging, display responsiveness can be prevented from being decreased by applying the processing according to the present disclosure.

It is to be noted that while the embodiment takes as an example the imaging device 1 that includes the temporary storage unit 26 (frame memories 26A and 26B) and performs the blackout free operation, the display control according to the present disclosure can be applied also in an imaging device 1 not including the temporary storage unit 26.

In a case of consecutive-shot imaging, for example, even the imaging device 1 that does not perform the blackout free operation performs light exposure of inter-frame images between a captured image and a next captured image, and displays these images as live view images. Then, when the display control is performed in a similar manner to the embodiment in the timing of the light exposure of the captured images, it is possible to realize display with good responsiveness and smooth display.

A program according to the embodiment is a program for making the above-described display control performed by an arithmetic processing device such, for example, as a CPU or the like.

Specifically, the program according to the embodiment is a program for making an arithmetic processing device perform control that, before starting processing of reading a pixel signal forming a still image to be recorded from an imaging element in a case where an operation for still image imaging and recording is performed, calculates displayable timing in a display unit for the still image, and performs display setting processing according to the calculated displayable timing.

Such a program enables the above-described camera control unit 21 to be implemented by an arithmetic processing device such as a microcomputer.

These programs can be recorded in advance on an HDD as a recording medium included in an apparatus such as a computer device, in a ROM within a microcomputer including a CPU, and so forth. Alternatively, the programs can be temporarily or permanently stored (recorded) in advance on a removable recording medium such as a flexible disk, a CD-ROM (Compact Disc Read Only Memory), an MO (Magneto Optical) disk, a DVD (Digital Versatile Disc), a Blu-ray Disc (registered trademark), a magnetic disk, a semiconductor memory, or a memory card. such a removable recording medium can be provided as generally-called packaged software.

In addition, such a program can be not only installed from the removable recording medium into a personal computer or the like but also downloaded from a download site via a network such as a LAN (Local Area Network), or the Internet.

It is to be noted that effects described in the present specification are merely illustrative and are not limited, and that there may be other effects.

It is to be noted that the present technology can also be implemented in such following configurations.

(1)
An imaging device including:
a control unit configured to, before starting processing of reading a pixel signal forming a still image to be recorded from an imaging element in a case where an operation for still image imaging and recording is performed, calculates displayable timing in a display unit for the still image, and performs display setting processing according to the calculated displayable timing.

(2)
The imaging device according to (1) above, in which
image data of one frame based on the pixel signal read from the imaging element is configured to be read from a memory and used for display after being temporarily written to the memory, and
the control unit performs control to start reading image data of a frame related to imaging after the operation from the memory before completion of writing the image data of the frame to the memory.

(3)
The imaging device according to (1) or (2) above, in which,
in a period of displaying an image imaged by the imaging element, without recording the image, a sensor synchronizing signal defining a frame period of an imaging operation in the imaging element and a display synchronizing signal defining a frame period of a display operation in the display unit are in a constant phase relation, and
the phase relation is varied when the operation for the still image imaging and recording is performed.

(4)
The imaging device according to any one of (1) to (3) above, in which,
during a light exposure period of light exposure in the imaging element in response to the operation for the still image imaging and recording, the control unit performs calculation of the displayable timing and processing of a display reservation that gives an instruction for a display setting according to the calculated displayable timing.

(5)
The imaging device according to any one of (1) to (4) above, in which
the control unit performs the display setting processing such that display is made in timing of a display synchronizing signal identified according to an anteroposterior relation between closing timing for each frame period based on the display synchronizing signal defining a frame period of a display operation in the display unit and timing of a display reservation that gives an instruction for a display setting in response to the calculation of the displayable timing.

(6)
The imaging device according to any one of (1) to (5) above, in which
the control unit performs processing of continuing image display on the display unit also in a period from a time of execution of the operation for the still image imaging and recording to execution of display based on the pixel signal forming the still image to be recorded.

(7)
The imaging device according to any one of (1) to (6) above, in which
the control unit performs adjustment processing of adjusting the displayable timing on the basis of a comparison between the displayable timing and timing of a display synchronizing signal defining a frame period of a display operation in the display unit.

(8)
The imaging device according to (7) above, in which
the control unit
sets a period from timing preceding the display synchronizing signal by a predetermined time to the timing of the display synchronizing signal as an adjustment target period, and,
when the displayable timing is within the adjustment target period, performs the adjustment processing of adjusting the displayable timing.

(9)
The imaging device according to (8) above, in which,
when the displayable timing is within the adjustment target period, the control unit performs the adjustment processing such that a time exceeding a time from the displayable timing to the display synchronizing signal is added to the displayable timing.

(10)
The imaging device according to any one of (7) to (9) above, in which
the control unit
sets a period from the timing of the display synchronizing signal to a time point succeeding the timing of the display synchronizing signal by a predetermined time as an adjustment target period, and,
when the displayable timing is within the adjustment target period, performs the adjustment processing of adjusting the displayable timing.

(11)
The imaging device according to (10) above, in which,
when the displayable timing is within the adjustment target period, the control unit performs the adjustment processing such that a time equal to or more than the predetermined time is added to the displayable timing.

(12)
The imaging device according to any one of (1) to (11) above, in which
the operation for the still image imaging and recording includes an operation for consecutive-shot imaging.

(13)
An imaging control method performed by an imaging control device, the imaging control method including:

performing control of, before starting processing of reading a pixel signal forming a still image to be recorded from an imaging element in a case where an operation for still image imaging and recording is performed, calculating displayable timing in a display unit for the still image, and performing display setting processing according to the calculated displayable timing.

(14)

A program for causing an arithmetic processing device to execute:

control of, before starting processing of reading a pixel signal forming a still image to be recorded from an imaging element in a case where an operation for still image imaging and recording is performed, calculating displayable timing in a display unit for the still image, and performing display setting processing according to the calculated displayable timing.

REFERENCE SIGNS LIST

1: Imaging device
12: Imaging element
13: Analog signal processing unit
14: Recording control unit
15: Display unit
17: Operating unit
20: Digital signal processing unit
21: Camera control unit
26: Temporary storage unit
26A, 26B: Frame memory
27: Memory unit
31: Software control block
32: Image sensor control block
33: Display control block
34: Memory controller
RS: Readout setting
TC: Timing calculation
DS: Display setting
DR: Display reservation
Tr: Closing timing
TMds: Displayable timing
aTMds: Post-adjustment displayable timing
SensV: Sensor synchronizing signal
SysV: Display synchronizing signal
KK: Adjustment target period

The invention claimed is:

1. An imaging device, comprising:
circuitry configured to:
before start of a process to read a pixel signal from an imaging element in a case where an operation to image and record a still image is performed, calculate a displayable timing for the still image, wherein the pixel signal forms the still image to be recorded; and
perform a display setting process based on the calculated displayable timing, wherein
in a period to display an image imaged by the imaging element, without recording the image, a sensor synchronizing signal and a display synchronizing signal are in a constant phase relation,
the sensor synchronizing signal defines a frame period of an imaging operation in the imaging element,
the display synchronizing signal defines a frame period of a display operation in a display unit, and
the phase relation is varied based on execution of the operation to image and record the still image.

2. The imaging device according to claim 1, wherein image data of a frame based on the pixel signal read from the imaging element is configured to be read from a memory and used for display after being temporarily written to the memory, and
the circuitry is further configured to start to read the image data of the frame related to imaging from the memory before the image data of the frame is completely written to the memory.

3. The imaging device according to claim 1, wherein during a light exposure period of light exposure in the imaging element in response to the operation to image and record the still image, the circuitry is further configured to:
calculate the displayable timing; and
process a display reservation that gives an instruction for a display setting based on the calculated displayable timing.

4. The imaging device according to claim 1, wherein the circuitry is further configured to perform the display setting process such that display is made in timing of the display synchronizing signal,
the display synchronizing signal is identified based on an anteroposterior relation between closing timing for each frame period and timing of a display reservation,
the closing timing for the each frame period is based on the display synchronizing signal that defines the frame period of the display operation in the display unit, and
the display reservation gives an instruction for a display setting based on the calculated displayable timing.

5. The imaging device according to claim 1, wherein the circuitry is further configured to continue display of the image on the display unit in a period from a time of execution of the operation to image and record the still image to execution of display based on the pixel signal that forms the still image to be recorded.

6. The imaging device according to claim 1, wherein the circuitry is further configured to perform an adjustment process to adjust the displayable timing based on a comparison between the displayable timing and timing of the display synchronizing signal that defines the frame period of the display operation in the display unit.

7. The imaging device according to claim 6, wherein the circuitry is further configured to:
set a period from a timing that precedes the display synchronizing signal by a specific time to the timing of the display synchronizing signal as an adjustment target period; and
based on the displayable timing that is within the adjustment target period, perform the adjustment process to adjust the displayable timing.

8. The imaging device according to claim 7, wherein based on the displayable timing that is within the adjustment target period, the circuitry is further configured to perform the adjustment process such that a time that exceeds a time from the displayable timing to the display synchronizing signal is added to the displayable timing.

9. The imaging device according to claim 6, wherein the circuitry is further configured to:
set a period from the timing of the display synchronizing signal to a time point that succeeds the timing of the display synchronizing signal by a specific time as an adjustment target period; and
based on the displayable timing that is within the adjustment target period, perform the adjustment process to adjust the displayable timing.

10. The imaging device according to claim 9, wherein, based on the displayable timing that is within the adjustment target period, the circuitry is further configured to perform the adjustment process such that a time equal to or more than the specific time is added to the displayable timing.

11. The imaging device according to claim 1, wherein the operation to image and record the still image includes an operation for consecutive-shot imaging.

12. An imaging control method performed by an imaging control device, the imaging control method comprising:
before starting a processing of reading a pixel signal from an imaging element in a case where an operation to image and record a still image is performed, calculating displayable timing for the still image, wherein the pixel signal forms the still image to be recorded; and
performing display setting processing based on the calculated displayable timing, wherein
in a period to display an image imaged by the imaging element, without recording the image, a sensor synchronizing signal and a display synchronizing signal are in a constant phase relation,
the sensor synchronizing signal defines a frame period of an imaging operation in the imaging element,
the display synchronizing signal defines a frame period of a display operation in a display unit, and
the phase relation is varied based on execution of the operation to image and record the still image.

13. A non-transitory computer-readable medium having stored thereon computer-executable instructions that, when executed by a computer, cause the computer to execute operations, the operations comprising:
before starting a processing of reading a pixel signal from an imaging element in a case where an operation to image and record a still image is performed, calculating displayable timing in for the still image, wherein the pixel signal forms the still image to be recorded; and
performing display setting processing based on the calculated displayable timing, wherein
in a period to display an image imaged by the imaging element, without recording the image, a sensor synchronizing signal and a display synchronizing signal are in a constant phase relation,
the sensor synchronizing signal defines a frame period of an imaging operation in the imaging element,
the display synchronizing signal defines a frame period of a display operation in a display unit, and
the phase relation is varied based on execution of the operation to image and record the still image.

14. An imaging device, comprising:
circuitry configured to:
before start of a process to read a pixel signal from an imaging element in a case where an operation to image and record a still image is performed, calculate a displayable timing for the still image, wherein the pixel signal forms the still image to be recorded;
perform a display setting process based on the calculated displayable timing; and
read image data of a frame related to imaging from a memory before the image data of the frame is completely written to the memory, wherein the image data of the frame based on the pixel signal read from the imaging element is configured to be read from the memory and used for display after being temporarily written to the memory.

* * * * *